(12) United States Patent
Saito et al.

(10) Patent No.: US 9,958,279 B2
(45) Date of Patent: May 1, 2018

(54) INFORMATION PROVISION DEVICE

(71) Applicant: Nissan Motor Co., Ltd., Kanagawa (JP)

(72) Inventors: Daisuke Saito, Kanagawa (JP); Tetsurou Ueda, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 22 days.

(21) Appl. No.: 14/412,017

(22) PCT Filed: Dec. 25, 2012

(86) PCT No.: PCT/JP2012/008254
§ 371 (c)(1),
(2) Date: Dec. 30, 2014

(87) PCT Pub. No.: WO2014/006666
PCT Pub. Date: Jan. 9, 2014

(65) Prior Publication Data
US 2015/0177009 A1 Jun. 25, 2015

(30) Foreign Application Priority Data
Jul. 5, 2012 (JP) .................................. 2012-151928

(51) Int. Cl.
*G01C 21/34* (2006.01)
*G01C 21/36* (2006.01)
(Continued)

(52) U.S. Cl.
CPC ................ *G01C 21/34* (2013.01); *B60L 3/00* (2013.01); *B60L 11/1838* (2013.01);
(Continued)

(58) Field of Classification Search
CPC ...... G01C 21/26; G01C 21/34; G01C 21/3476; G01C 21/3469; G01C 21/3484;
(Continued)

(56) References Cited

U.S. PATENT DOCUMENTS 8,417,401 B2* 4/2013 Takahara et al. ................ 701/22
8,712,650 B2* 4/2014 Koebler et al. .................. 701/51
(Continued)

FOREIGN PATENT DOCUMENTS

JP 2005-098749 A 4/2005
JP 2010-078563 A 4/2010
(Continued)

OTHER PUBLICATIONS

International Search Report issued in PCT/JP2012/008254 dated Apr. 2, 2013 (4 pages).
(Continued)

*Primary Examiner* — Jerrah Edwards
(74) *Attorney, Agent, or Firm* — Osha Liang LLP

(57) ABSTRACT

An information provision device has a history information storage part configured to sequentially acquire at least one of traveling location information, power consumption information and charging location information from an in-vehicle device mounted on a vehicle including an electric motor as a driving source for storing as traveling history information, a planned route acquisition part configured to acquire a planned route from a starting position to a destination, a provided route determination part configured to refer to the traveling history information stored in the history information storage part and determine a provided route that is as same as or similar to the planned route acquired by the planned route acquisition part from traveling routes along which the vehicle traveled, and a provided information determination part.

7 Claims, 9 Drawing Sheets

(51) Int. Cl.
  *B60L 3/00* (2006.01)
  *G08G 1/01* (2006.01)
  *G08G 1/0968* (2006.01)
  *B60L 11/18* (2006.01)

(52) U.S. Cl.
  CPC ..... *G01C 21/3469* (2013.01); *G01C 21/3476* (2013.01); *G01C 21/3679* (2013.01); *G08G 1/0112* (2013.01); *G08G 1/0129* (2013.01); *G08G 1/0133* (2013.01); *G08G 1/0141* (2013.01); *G08G 1/096827* (2013.01); *B60L 2240/622* (2013.01); *Y02T 10/7005* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/161* (2013.01); *Y02T 90/162* (2013.01); *Y02T 90/163* (2013.01)

(58) Field of Classification Search
  CPC ............ G01C 21/3492; G01C 21/3617; G01C 21/3641; G01C 21/3679; G01C 21/3694; G01C 21/3697; G08G 1/0104; G08G 1/0112; G08G 1/0129; G08G 1/0133; G08G 1/0141; G08G 1/096827; G06Q 10/047; B60L 3/00
  See application file for complete search history.

(56) References Cited

U.S. PATENT DOCUMENTS

| | | | |
|---|---|---|---|
| 8,996,213 B2* | 3/2015 | Ishikawa | B60L 15/2045 701/22 |
| 2010/0094496 A1* | 4/2010 | Hershkovitz | B60L 3/12 701/22 |
| 2011/0032110 A1 | 2/2011 | Taguchi | |
| 2011/0224900 A1 | 9/2011 | Hiruta et al. | |
| 2011/0313647 A1* | 12/2011 | Koebler et al. | 701/123 |
| 2013/0079962 A1* | 3/2013 | Ishikawa | B60L 15/2045 701/22 |

FOREIGN PATENT DOCUMENTS

| | | |
|---|---|---|
| JP | 2011-038845 A | 2/2011 |
| JP | 2011-174753 A | 9/2011 |
| JP | 2011-185785 A | 9/2011 |
| JP | 2011-229362 A | 11/2011 |

OTHER PUBLICATIONS

Written Opinion of the International Searching Authority issued in PCT/JP2012/008254 dated Apr. 2, 2013 (4 pages).
International Preliminary Report on Patentability from PCT/JP2012/008254 dated Sep. 24, 2013 (13 pages).

* cited by examiner

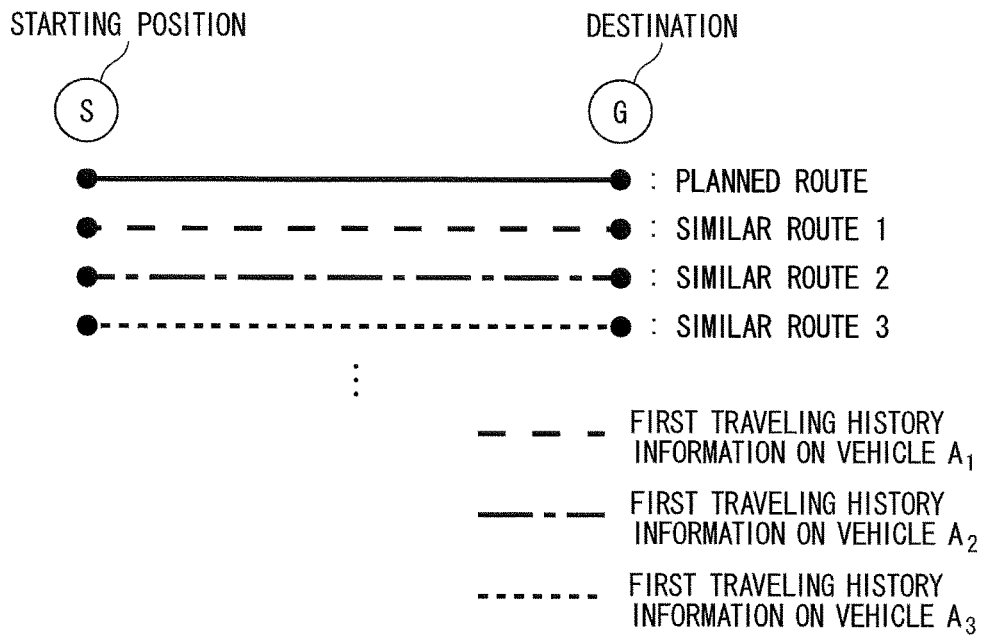
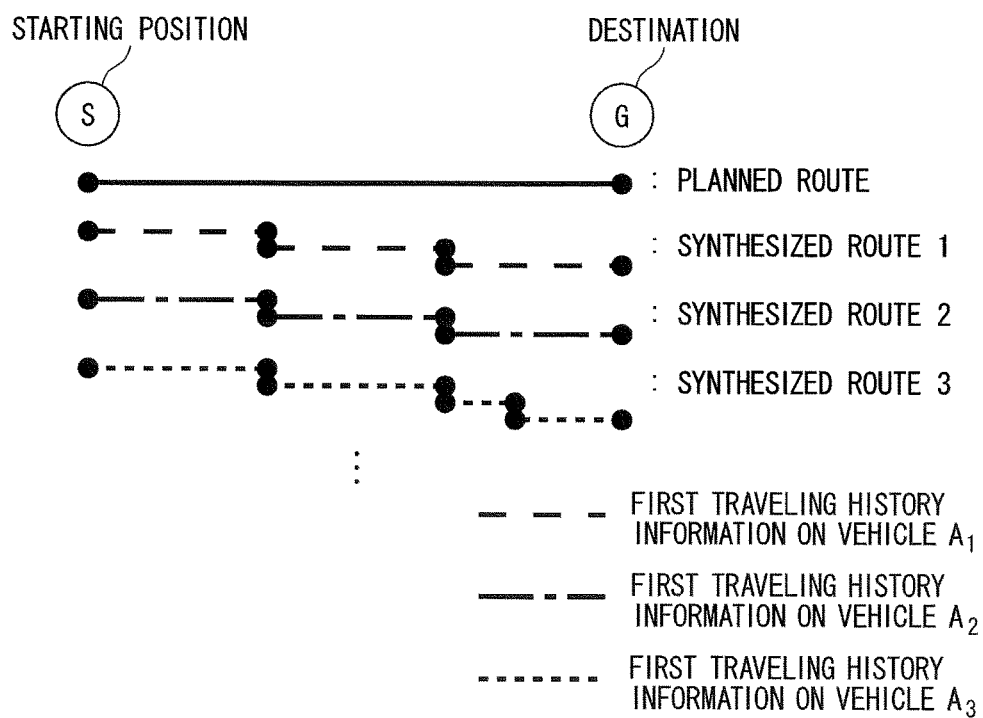

INFORMATION PROVISION DEVICE

CROSS-REFERENCE TO RELATED APPLICATIONS

The present application claims priority to Japanese Patent Application No. 2012-151928 (filed on Jul. 5, 2012), the contents of which is incorporated by reference in its entirety.

BACKGROUND

Technical Field

The present invention relates to information provision devices that provide information on power consumption and the location of a charging facility along the route when driving a vehicle including an electric motor as a driving source to a destination.

Related Art

Conventionally available techniques of this type include a technique described in Patent Literature 1, for example.

This conventional technique is configured to search for a traveling route to the destination and predict power consumption when a vehicle travels along the traveling route on the basis of the total length of the searched traveling route and predetermined power consumption per unit distance (hereinafter called theoretical performance of a vehicle). The conventional technique is then configured to, when the power consumption predicted is larger than the amount of electricity stored in the battery for traveling, provide information on the location of a charging facility where the battery for traveling can be charged as well as the traveling route.

CITATION LIST

Patent Literature

PTL 1: JP 2011-38845 A

SUMMARY

The above conventional technique, however, is configured to predict the power consumption on the basis of the theoretical performance of the vehicle. This means that, if the actual performance of the vehicle and the theoretical performance differ, the predicted value of power consumption may differ from the actual power consumption. That is, the above conventional technique may fail to provide information correctly.

In view of these points, the present invention aims to provide information on power consumption and information on a charging location along the route matching with the actual environment.

One or more embodiments of the present invention is configured to sequentially acquire at least one of traveling location information, power consumption information and charging location information from an in-vehicle device mounted on a vehicle including an electric motor as a driving source for storage as traveling history information. Then, one aspect of the present invention is configured to refer to the traveling history information stored and determine a provided route that is the same as or similar to a planned route. Subsequently, one aspect of the present invention is configured to refer to the traveling history information stored and determine at least one of power consumed during traveling along the provided route determined and a charging location along route that the vehicle passes by during traveling along the provided route. Subsequently, one aspect of the present invention is configured to provide information on the determined provided route and information on at least one of the determined power consumption and charging location along the route.

One aspect of the present invention is configured to determine the power consumption and the charging location along the route during the traveling with the vehicle by referring to traveling history information, i.e., information obtained from the actual traveling with the vehicle. This means that one aspect of the present invention can provide information on the power consumption and the charging location along the route corresponding to the actual environment.

BRIEF DESCRIPTION OF DRAWINGS

FIG. 7 describes a similar route;

FIG. 8 describes a synthesized route;

DETAILED DESCRIPTION

Embodiments of the present invention will now be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

The following describes embodiments of the present invention, with reference to the drawings.

The present embodiment is an application of the present invention to an information provision system that provides information on power consumption and the location of a charging facility along the route when driving a vehicle including an electric motor as a driving source to a destination.

(Configuration)

Figure 1:
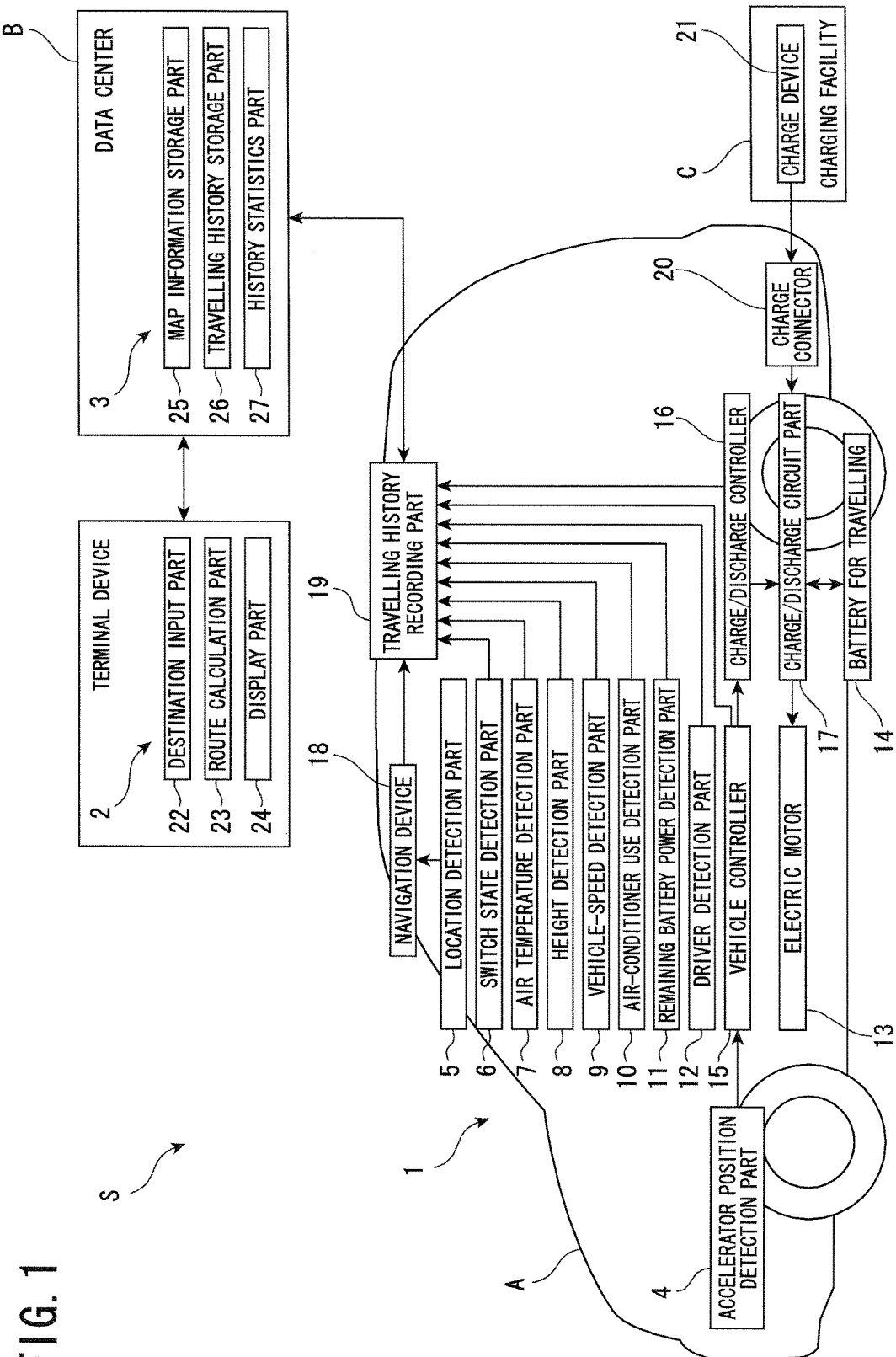
FIG. 1 schematically illustrates the configuration of an information provision system S.

FIG. 1 schematically illustrates the configuration of an information provision system S.

As illustrated in FIG. 1, the information provision system S includes an in-vehicle device 1 mounted on each of a plurality of vehicles A having an electric motor 13 as a driving source, a terminal device 2 that the owner of a vehicle A has, and an information provision device 3 that a data center B has. The in-vehicle device 1 and the information provision device 3 or the terminal device 2 and the information provision device 3 exchange information via a communication path. Examples of the communication path include a mobile phone network, a wireless LAN network, a Dedicated Short Range Communications (DSRC) network and a power line communication network. In an alternative configuration, each of the in-vehicle device 1 and the information provision device 3 may record information on a removable storage medium such as a flash memory and exchange the recorded information via a terminal equipped with a communication function.

(Configuration of in-Vehicle Device 1)

The in-vehicle device 1 includes an accelerator position detection part 4, a location detection part 5, a switch state detection part 6, an air temperature detection part 7, a height detection part 8, a vehicle-speed detection part 9, an air-conditioner use detection part 10, a remaining battery power detection part 11 and a driver detection part 12.

The accelerator position detection part 4 detects an accelerator position of the own vehicle A. Then the accelerator position detection part 4 outputs information on a result of the detection to a vehicle controller 15.

The location detection part 5 detects the current location (e.g., latitude and longitude) of the own vehicle A on the basis of a GPS signal transmitted from a Global Positioning System (GPS) satellite. Then the location detection part 5 outputs information on a result of the detection to a navigation device 18 described later.

The switch state detection part 6 detects a switch-state of an ignition switch of the own vehicle A. The switch-state includes an ON-state and an OFF-state, for example. Then the switch state detection part 6 outputs information on a result of the detection to a traveling history recording part 19 described later.

The air temperature detection part 7 detects the air-temperature at the current location of the own vehicle A. Then the air temperature detection part 7 outputs information on a result of the detection to the traveling history recording part 19.

The height detection part 8 detects the height at the current location of the own vehicle A. Then the height detection part 8 outputs information on a result of the detection to the traveling history recording part 19.

The vehicle-speed detection part 9 detects the vehicle speed of the own vehicle A. Then the vehicle-speed detection part 9 outputs information on a result of the detection to the traveling history recording part 19.

The air-conditioner use detection part 10 detects the amount of air-conditioner used of the own vehicle A. The amount of air-conditioner used may be power consumed by the air-conditioner, for example. Then the air-conditioner use detection part 10 outputs information on a result of the detection to the traveling history recording part 19.

The remaining battery power detection part 11 detects the remaining battery power of the own vehicle A. The remaining battery power may be the remaining amount of a battery for traveling 14 that supplies electricity to the electric motor 13 as a driving source, for example. Then the remaining battery power detection part 11 outputs information on a result of the detection to the traveling history recording part 19.

The driver detection part 12 detects the drivers ID (Identification) of the driver of the own vehicle A. The driver ID may be a number to identify the driver uniquely, for example. Then the driver detection part 12 outputs information on a result of the detection to the traveling history recording part 19.

The in-vehicle device 1 further includes the vehicle controller 15, a charge/discharge controller 16, a charge/discharge circuit part 17, the navigation device 18, and the traveling history recording part 19.

The vehicle controller 15 acquires information (accelerator position) that the accelerator position detection part 4 outputs. Then the vehicle controller 15 outputs the acquired information to the traveling history recording part 19. The vehicle controller 15 further outputs a control instruction to the charge/discharge controller 16 to supply electricity in accordance with the accelerator position to the electric motor 13 on the basis of the acquired information (accelerator position).

In accordance with the control instruction from the vehicle controller 15, the charge/discharge controller 16 outputs a control instruction to the charge/discharge circuit part 17 to supply electricity stored in the battery for traveling 14 to the electric motor 13. The charge/discharge controller 16 detects the charge state and the charge time of the battery for traveling 14. The charge state includes charging and not-charging, for example. The charge time includes the time from the start of the charge to the end of the charge, for example. Then the charge/discharge controller 16 outputs information on a result of the detection to the traveling history recording part 19.

In accordance with the control instruction from the charge/discharge controller 16, the charge/discharge circuit part 17 supplies electricity stored in the battery for traveling 14 to the electric motor 13. This allows the electric motor 13 to generate a driving force. The charge/discharge circuit part 17 connects to a charge device 21 via a charge connector 20. The charge device 21 may be a device provided in a charging facility C and that supplies electricity to charge the battery for traveling 14. Then the charge/discharge circuit part 17 charges the battery for traveling 14 with the power supplied from the charge device 21 connected to the charge connector 20.

The navigation device 18 acquires information (latitude and longitude (the current location of the own vehicle A) that the location detection part 5 outputs. Then on the basis of the acquired information (latitude and longitude (the current location of the own vehicle A), the navigation device 18 presents guide information to guide the own vehicle A along the guide route from the starting position and the destination that the driver designates to the driver. The navigation device 18 outputs the acquired information and the guide route to the traveling history recording part 19.

The traveling history recording part 19 executes traveling history information recording processing on the basis of the information output from various detection parts 6 to 12, the vehicle controller 15, the charge/discharge controller 16 and the navigation device 18. In the traveling history information recording processing, first traveling history information and second traveling history information described later are recorded. Then the traveling history recording part 19 transmits the recorded first traveling history information and second traveling history information to the information provision device 3. The details of the traveling history information recording processing are described later.

(Configuration of Terminal Device 2),

The terminal device 2 includes a destination input part 22, a route calculation part 23 and a display part 24. Examples of the terminal device 2 include a mobile phone terminal and a personal computer.

The destination input part 22 receives an input from the user of the terminal device 2, such as a starting position, a destination, remaining battery power (e.g., remaining battery power of the vehicle A that the user has) and a driver ID (e.g., driver ID that identifies the user). Then the destination input part 22 outputs the received information on the starting position, the destination, the remaining battery power and the driver ID to the route calculation part 23.

The route calculation part 23 executes route provision processing on the basis of the information (starting position, destination) that the destination input part 22 outputs. In the route provision processing, the route calculation part 23 transmits a request to search for a provided route (hereinafter this may be called a provided route searching request) to the information provision device 3. Subsequently the route calculation part 23 receives a provided route, power consumed during traveling along the provided route and the location (hereinafter called a charging location along the route) of a charging facility C during traveling along the provided route from the information provision device 3. Receiving such information from the information provision device 3, the route calculation part 23 outputs a control signal to the display part 24 to display the received information. The details of the route provision processing are described later.

The present embodiment describes the example where the terminal device 2 executes the route provision processing, and another configuration may be used. For instance, the location detection part 5, the route calculation part 23 and the display part 24 may be implemented with the navigation device 18.

Figure 2:
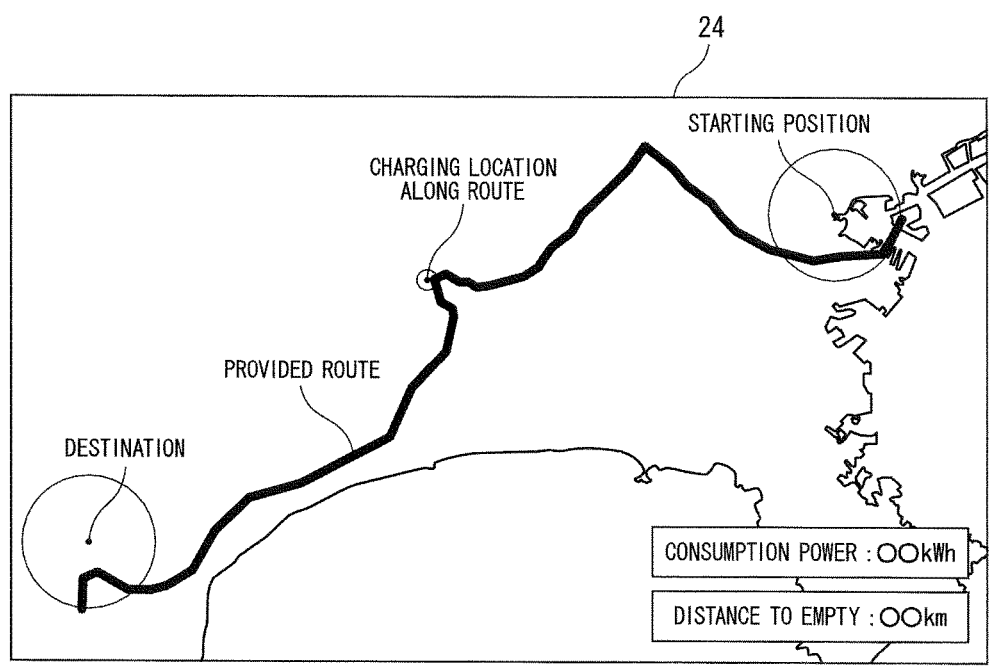
FIG. 2 represents the contents displayed on a display part 24.

FIG. 2 represents the contents displayed on the display part 24.

As illustrated in FIG. 2, the display part 24 displays, on the display screen, information on a provided route, power consumed during traveling along the provided route and the charging location along the route during traveling along the provided route in accordance with the control signal that the route calculation part 23 outputs. This allows the user of the terminal device 2 to confirm the power consumption and the charging location along the route when driving the vehicle A to the destination beforehand.

(Configuration of Information Provision Device 3)

Referring back to FIG. 1, the information provision device 3 includes a map information storage part 25, a traveling history storage part 26 and a history statistics part 27.

The map information storage part 25 stores map information on a region where the vehicle A travels. The map information contains a node and a link to represent a road network and the location of a charging facility C, for example.

The traveling history storage part 26 executes history storage processing on the basis of the first traveling history information and the second traveling history information that the in-vehicle device 1 transmits. In the history storage processing, the traveling history storage part 26 sequentially receives (acquires) the first traveling history information and the second traveling history information that the in-vehicle device 1 transmits. Then the traveling history storage part 26 stores the received first traveling history information and second traveling history information as traveling history information. The details of the history storage processing are described later.

The history statistics part 27 refers to the provided route searching request that the terminal device 2 outputs, the map information stored in the map information storage part 25, and the traveling history information (first traveling history information and second traveling history information) stored in the traveling history storage part 26 to execute traveling history statistical processing. In the traveling history statistical processing, the history statistics part 27 refers to map information stored in the map information storage part 25 on the basis of the provided route searching request that the terminal device 2 outputs, and searches for (acquires) a planed route from the starting position to the destination. The planned route may be a traveling route enabling the traveling in the shortest time from the starting position to the destination, for example. Subsequently, the history statistics part 27 refers to the traveling history information (first traveling history information) stored in the traveling history storage part 26 and determines a provided route that is the same as or similar to the planned route searched (acquired). Subsequently, the history statistics part 27 refers to the traveling history information (first traveling history information and second traveling history information) stored in the traveling history storage part 26 and determines power consumed during traveling along the determined provided route and a charging location along the route that the vehicle will pass by during traveling along the provided route. Then the history statistics part 27 transmits (provides) information on the determined provided route, power consumption and charging location along the route to the in-vehicle device 1. Then, the in-vehicle device 1 presents information on the provided route, the power consumed during traveling along the determined provided route and the charging location along the route that the vehicle will pass by during traveling along the provided route on the basis of the information that the history statistics part 27 outputs. The details of the traveling history statistical processing will be described later.

(Calculation Processing)

Next, the following describes the traveling history information recording processing executed by the traveling history recording part 19. The traveling history recording part 19 executes the traveling history information recording processing every time a predetermined setting time (e.g., 10 msec.) is reached.

Figure 3:
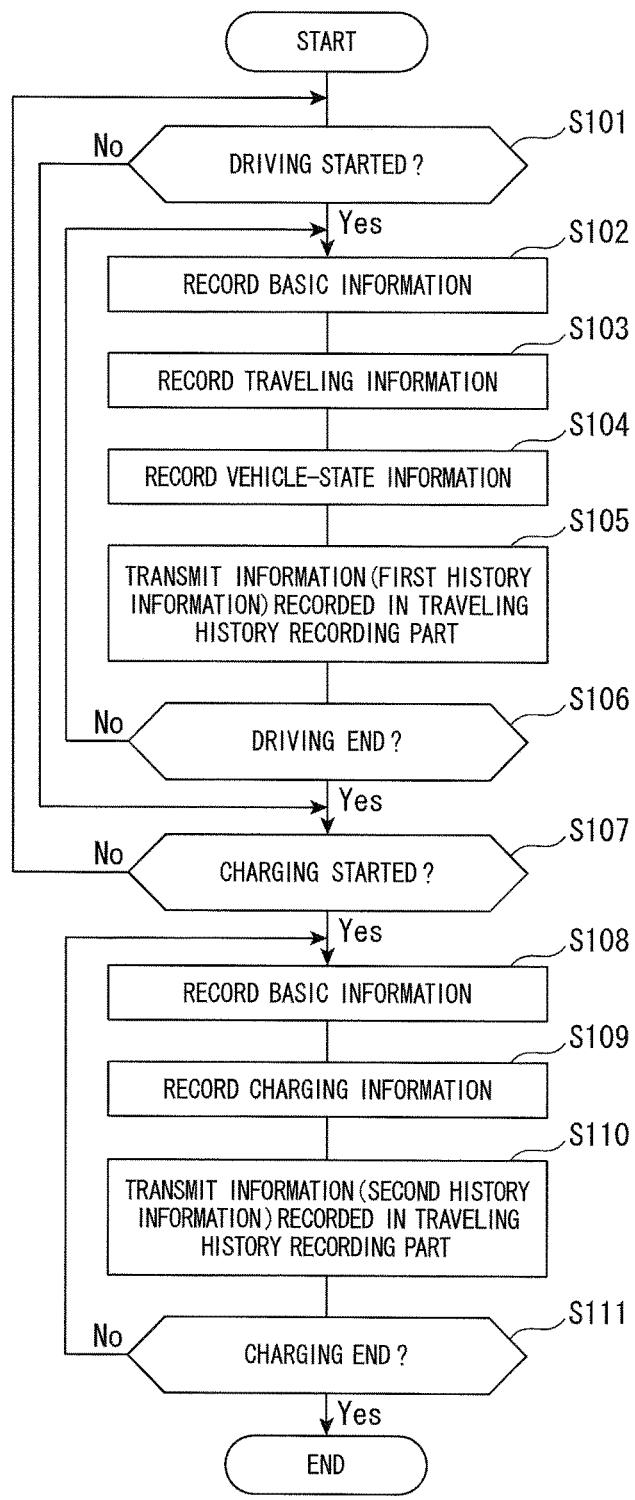
FIG. 3 is a flowchart illustrating traveling history information recording processing.

FIG. 3 is a flowchart illustrating the traveling history information recording processing.

As illustrated in FIG. 3, at Step S101, the traveling history recording part 19 determines whether the driver starts the driving of the own vehicle A or not. Specifically the traveling history recording part 19 determines whether the ignition switch is in the ON state or not on the basis of information (switch state of the ignition switch) that the switch state detection part 6 outputs. When the traveling history recording part 19 determines that the ignition switch is in the ON state (Yes), the traveling history recording part 19 determines that the driver starts the driving of the own vehicle A, and the procedure shifts to Step S102. On the other hand, when the traveling history recording part 19 determines that the ignition switch is in the OFF state (No), the traveling history recording part 19 determines that the driver does not start the driving of the own vehicle A, and this calculation processing ends.

At the step S102 stated above, the traveling history recording part 19 records information to identify the own vehicle A (vehicle ID), information that the driver detection part 12 outputs (driver ID), information that the air temperature detection part 7 outputs (air temperature) and the current date and time in the traveling history recording part 19 as basic information.

Subsequently, the procedure shifts to Step S103, where the traveling history recording part 19 records information that the location detection part 5 and the height detection part 8 output (latitude and longitude) and a traveling route (hereinafter this may be called traveling location information) in the traveling history recording part 19 as traveling information. The traveling route may be the one along which the own vehicle A travels while following the guide route that the navigation device 18 presents, for example, and so information (guide route) that the navigation device 18 outputs can be used therefor.

Subsequently, the procedure shifts to Step S104, where the traveling history recording part 19 records information that the detection parts 4, 9 and 10 output (vehicle speed, accelerator position, and the amount of air-conditioner use) in the traveling history recording part 19 as vehicle state information. Herein, when the traveling along the guide route that the navigation device 18 guides finishes, the traveling history recording part 19 records power consumed during the traveling along the guide route (hereinafter this may be called power consumption information) to be included in the vehicle state information. The power consumption may be calculated, for example, by using a result of the subtraction that is obtained by subtracting the remaining battery power when the vehicle arrives at the destination of the traveling route from the remaining battery power when the vehicle starts from the starting position of the guide route.

Subsequently, the procedure shifts to Step S105, where the traveling history recording part 19 transmits information containing the basic information, the traveling information and the vehicle-state information stored in the traveling history recording part 19 to the information provision device 3 as the first traveling history information.

Subsequently, the procedure shifts to Step S106, where the traveling history recording part 19 determines whether the driver finishes the driving of the own vehicle A or not. Specifically the traveling history recording part 19 determines whether the ignition switch is in the OFF state or not on the basis of information (switch state of the ignition switch) that the switch state detection part 6 outputs. When the traveling history recording part 19 determines that the ignition switch is in the OFF state (Yes), the traveling history recording part 19 determines that the driver finishes the driving of the own vehicle A, and the procedure shifts to Step S107. On the other hand, when the traveling history recording part 19 determines that the ignition switch is in the ON state (No), the traveling history recording part 19 determines that the driver does not finish the driving of the own vehicle A, and the procedure shifts to the Step S102.

At the Step S107 stated above, the traveling history recording part 19 determines whether charging of the battery for traveling 14 starts or not. Specifically the traveling history recording part 19 determines whether the battery for traveling 14 is in the charging state or not on the basis of information (charging state of the battery for traveling 14) that the charge/discharge controller 16 outputs. Then when the traveling history recording part 19 determines that the battery for traveling 14 is in the charging state (Yes), the traveling history recording part 19 determines that the charging of the battery for traveling 14 starts, and the procedure shifts to Step S108. On the other hand, when the traveling history recording part 19 determines that the battery for traveling 14 is not in the charging state (No), the traveling history recording part 19 determines that the charging of the battery for traveling 14 does not start, and the procedure shifts to the Step S101.

At the Step S108 stated above, the traveling history recording part 19 records the information (air temperature) that the air temperature detection part 7 outputs and the current date and time in the traveling history recording part 19 as basic information.

Subsequently at Step S109, the traveling history recording part 19 records the information that the location detection part 5, the remaining battery power detection part 11 and the charge/discharge controller 16 output (latitude and longitude of a charging location along the route (hereinafter this may be called charging location information), charging amount, charging time) in the traveling history recording part 19 as charging information.

Subsequently at Step S110, the traveling history recording part 19 transmits information containing the basic information and the charging information stored in the traveling history recording part 19 to the information provision device 3 as the second traveling history information. At this time, the traveling history recording part 19 associates the traveling history information transmitted at the Step S105 with the second traveling history information. This allows the traveling history recording part 19 to associate the traveling route along which the own vehicle A traveled, and the charging location along the route that the vehicle passed by during the traveling along the traveling route.

Subsequently the procedure shifts to Step S111, where the traveling history recording part 19 determines whether the charging of the battery for traveling 14 finishes or not. Specifically the traveling history recording part 19 determines whether the battery for traveling 14 is in the charging state or not on the basis of information (charging state of the battery for traveling 14) that the charge/discharge controller 16 outputs. Then when the traveling history recording part 19 determines that the battery for traveling 14 is not in the charging state (Yes), the traveling history recording part 19 determines that the charging of the battery for traveling 14 ends, and this calculation processing ends. On the other hand, when the traveling history recording part 19 determines that the battery for traveling 14 is in the charging state (No), the traveling history recording part 19 determines that the charging of the battery for traveling 14 does not finish the charging of the battery for traveling 14, and the procedure shifts to the Step S108.

Next, the following describes the route provision processing executed by the route calculation part 23. The route calculation part 23 executes the route provision processing every time the destination input part 22 outputs information.

Figure 4:
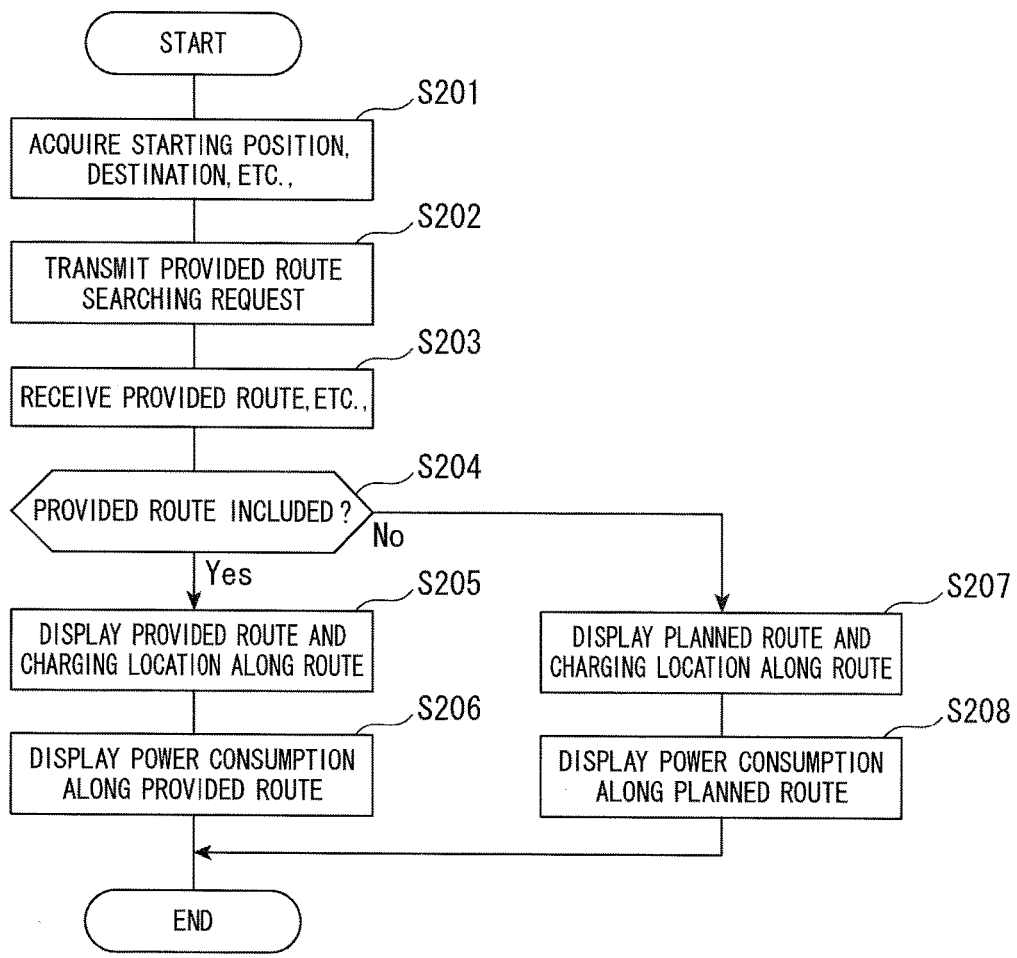
FIG. 4 is a flowchart illustrating route provision processing.

FIG. 4 is a flowchart illustrating the route provision processing.

As illustrated in FIG. 4, at Step S201, the route calculation part 23 acquires the information that the destination input part 22 outputs (starting position, destination, remaining battery power, driver ID).

Subsequently the procedure shifts to Step S202, where the route calculation part 23 transmits a provided route searching request to the information provision device 3. The provided route searching request may be information on the starting position, the destination, the remaining battery power and the driver ID acquired at the Step S201, for example. This allows the history statistics part 27 of the information provision device 3 to search for (acquire) a planned route from the starting position to the destination while referring to the map information, stored in the map information storage part 25 in response to the provided route searching request that the route calculation part 23 outputs. Subsequently the history statistics part 27 refers to the traveling history information (first traveling history information) stored in the traveling history storage part 26 to determine the provided route that is the same as or similar to the planned route searched (acquired). Subsequently the history statistics part 27 refers to the traveling history information (first traveling history information and second traveling history information) stored in the traveling history storage part 26 to determine the power consumed during traveling along the determined provided route and a charging location along the route that the vehicle passes by during traveling along the provided route. Then the history statistics part 27 transmits (provides) information on the determined provided route, power consumption and charging location along the route to the in-vehicle device 1. When the provided route cannot be determined (calculated), the history statistics part 27 transmits (provides) information on the planned route searched to the in-vehicle device 1 instead of information on the provided route.

Subsequently the procedure shifts to Step S203, where the route calculation part 23 receives the information (information containing provided route, power consumption and charging location along the route) that the information provision device 3 transmits.

Subsequently the procedure shifts to Step S204, where the route calculation part 23 determines whether the information acquired at the Step S203 contains information on the provided route or not. Then, when the route calculation part 23 determines that it contains information on the provided route (Yes), the procedure shifts to Step S205. On the other hand, when the route calculation part 23 determines that it does not contain information on the provided route (contains information on the planned route) (No), the procedure shifts to Step S207.

At the Step S205 stated above, the route calculation part 23 outputs a control instruction to the display part 24 to display information on the provided route and the charging location along the route in the information (provided route, power consumption and charging location along the route) acquired at the Step S203.

Subsequently at Step S206, the route calculation part 23 outputs a control instruction to the display part 24 to display information on the power consumption in the information (provided route, power consumption and charging location along the route) acquired at the Step S203, and then this calculation processing ends.

Meanwhile, at the Step S207 stated above, the route calculation part 23 outputs a control instruction to the display part 24 to display information on the planned route and the charging location along the route in the information (provided route, power consumption and charging location along the route) acquired at the Step S203.

Subsequently at Step S208, the route calculation part 23 outputs a control instruction to the display part 24 to display information on the power consumption in the information (planned route, power consumption and charging location along the route) acquired at the Step S203, and then this calculation processing ends.

Next, the following describes the history storage processing executed by the traveling history storage part 26. Receiving the first traveling history information or the second traveling history information that the traveling history recording part 19 transmits, the traveling history storage part 26 executes the history storage processing.

Figure 5:
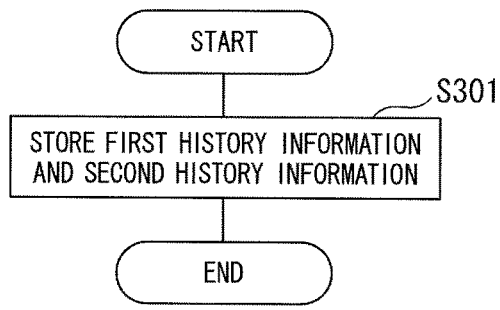
FIG. 5 is a flowchart illustrating history storage processing.

FIG. 5 is a flowchart illustrating the history storage processing.

As illustrated in FIG. 5, at Step S301, the traveling history storage part 26 stores the received first traveling history information or second traveling history information in the traveling history storage part 26, and then finishes this calculation processing. At this time, the traveling history storage part 26 stores the presence or not of a traffic jam, the day of the week, the season, the weather, the traveling time zone, the traveling power consumption and the average vehicle-speed as well to be included in the traveling history information (first traveling history information, second traveling history information). The presence or not of a traffic jam may be the presence or not of a traffic jam on the date and time and in the traveling route included in the traveling history information, for example. The day of the week may be the day, to which the date and time included in the traveling history information belongs, for example. The season may be the season, to which the date and time included in the traveling history information belongs, for example. The weather may be the weather on the date and time and at the latitude and longitude included in the traveling history information, for example. The time zone may be the time zone, to which the date and time included in the traveling history information belongs, for example. The traveling power consumption may be the amount of reduction in the remaining battery power per unit time included in the traveling history information, for example. The average vehicle-speed may be the average at the setting time (e.g., 10 min) of the vehicle speed included in the traveling history information, for example.

The present embodiment describes the example where the traveling history recording part 19 sets the information (guide route) that the navigation device 18 outputs as the traveling route, and another configuration may be used. For instance, when there is a part where the vehicle A did not travel actually in the traveling route of the first traveling history information, the traveling history storage part 26 corrects such a part to be the traveling route along which the vehicle A actually traveled on the basis of the traveling history information (latitude and longitude) stored in the traveling history storage part 26. This allows the traveling history storage part 26 to store the information on the traveling route, along which the vehicle A actually traveled.

Next, the following describes the history statistical processing executed by the history statistics part 27. Receiving a provided route searching request that the traveling history recording part 19 transmits, the history statistics part 27 executes the history statistical processing.

Figure 6:
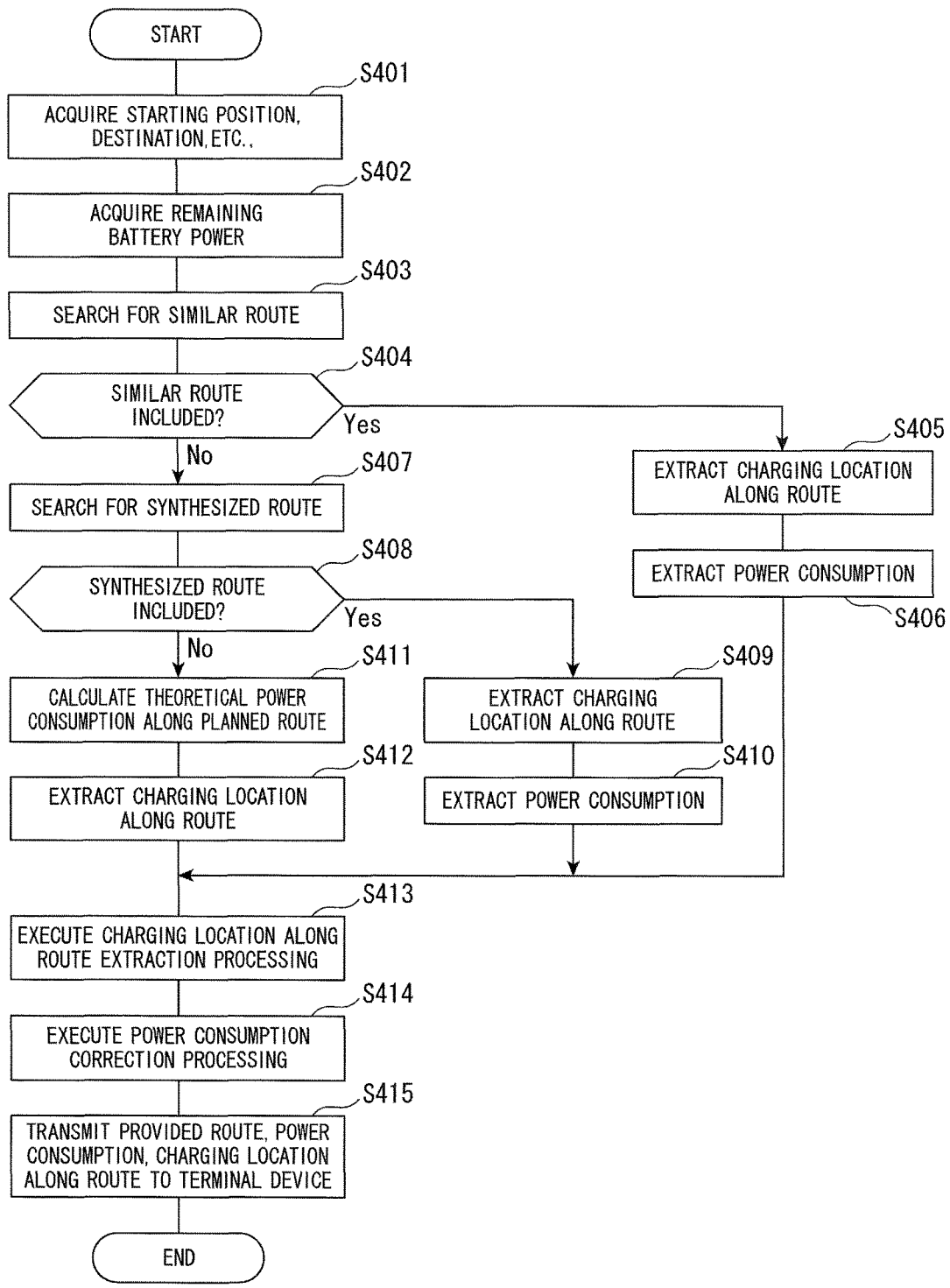
FIG. 6 is a flowchart illustrating history statistical processing.

FIG. 6 is a flowchart illustrating the history statistical processing.

As illustrated in FIG. 6, at Step S401, the history statistics part 27 acquires the starting position and the destination from the received provided route searching request. Subsequently the history statistics part 27 searches for (acquires) a planned route from the starting position and the destination acquired on the basis of the map information stored in the map information storage part 25.

The present embodiment describes the example where the history statistics part 27 (information provision device 3) searches for (acquires) a planned route, but another configuration may be used. For instance, the navigation device 18 (in-vehicle device 1) may search for a planned route. In this case, the navigation device 18 transmits a search result of a planned route to the history statistics part 27, and the history statistics part 27 receives (acquires) the planned route that navigation device 18 transmits.

Subsequently the procedure shifts to Step S402, where the history statistics part 27 acquires the remaining battery power from the provided route searching request received.

FIG. 7 describes a similar route.

Subsequently the procedure shifts to Step S403, where as illustrated in FIG. 7, the history statistics part 27 refers to the first traveling history information stored in the traveling history storage part 26 to search for (determine) a similar provided route (hereinafter this may be called a similar route) that is the same as or similar to the planned route. The similar provided route may be a provided route having a difference from the planned route (starting position, destination or the like) within a set distance (e.g., within 20 m). For instance, the history statistics part 27 extracts a similar route from the first traveling history information (traveling route) stored in the traveling history storage part 26. When there is no appropriate similar route in the first traveling history information (traveling route) stored in the traveling history storage part 26, the history statistics part 27 abandons the extraction of a similar route.

The present embodiment describes the example where the history statistics part 27 extracts a traveling route having a difference from the planned route within a set distance from the first traveling history information (traveling routes) stored in the traveling history storage part 26, but another configuration may be used. For instance, the history statistics part 27 may find a provided route with consideration given to a similarity of a condition such as the traveling time (season, air-temperature) or using or not of an air-conditioner during traveling in addition to the difference from the planned route. Specifically the history statistics part 27 extracts the first traveling history information including the season, the air-temperature and the amount of air-conditioner use that is the same as or similar to the current season, air-temperature and the amount of air-conditioner use from the first traveling history information stored in the traveling history storage part 26. Subsequently, the history statistics part 27 extracts a traveling route having a difference from the planned route within a set distance (20 m) from the extracted first traveling history information. In this case, the history statistics part 27 can extract a provided route that meets the current condition more, and so the reliability of the provided route extracted can be improved.

Subsequently the procedure shifts to Step S404, where the history statistics part 27 determines whether a similar route can be extracted or not at the Step S403. Then when the history statistics part 27 determines that a similar route can be extracted (Yes), the procedure shifts to Step S405. On the other hand, when the history statistics part 27 determines that a similar route cannot be extracted (abandons the extraction of a similar route) (No), the procedure shifts to Step S407.

At the Step S405 stated above, the history statistics part 27 extracts a charging location along the route that a vehicle passes by during traveling along a similar route extracted at the Step S403 from the second traveling history information (charging location along the route) stored in the traveling history storage part 26. For instance, the history statistics part 27 searches for the first traveling history information including a similar route that is extracted at the Step S403 from the first traveling history information stored in the traveling history storage part 26. Subsequently, the history statistics part 27 extracts a charging location along the route from the second traveling history information that is associated with the first traveling history information searched from the second traveling history information (charging location along the route) stored in the traveling history storage part 26.

Subsequently the procedure shifts to Step S406, where the history statistics part 27 extracts the power consumed during traveling along the similar route extracted at the Step S403 from the first traveling history information (power consumption) stored in the traveling history storage part 26, and then the procedure shifts to Step S413. For instance, the history statistics part 27 extracts the power consumption from the first traveling history information including the similar route extracted at the Step S403.

In this way, the present embodiment is configured so that the history statistics part 27 extracts a similar route from the first traveling history information stored in the traveling history storage part 26. Subsequently the history statistics part 27 extracts a charging location along the route that the vehicle passes by during traveling along the similar route from the second traveling history information stored in the traveling history storage part 26. Subsequently the history statistics part 27 extracts the power consumed during traveling along the similar route extracted from the first traveling history information stored in the traveling history storage part 26. This allows more suitable power consumption and such charging location along the route to be acquired. As a result, information on the power consumption and information on the charging location along the route that are more suitable to the actual environment can be provided.

FIG. 8 describes a synthesized route.

Meanwhile, at the Step S407 stated above, the history statistics part 27 refers to the first traveling history information stored in the traveling history storage part 26 and searches for (determine) a provided route (hereinafter this may be called a synthesized route) that is the same as or similar to the planned route and that is prepared by synthesizing a plurality of traveling routes. Specifically as illustrated in FIG. 8, the history statistics part 27 refers to the first traveling history information stored in the traveling history storage part 26 and synthesizes a plurality of traveling routes along which the same vehicle traveled to form a synthesized route. For instance, the history statistics part 27 firstly extracts the first traveling history information having the same vehicle ID from the first traveling history information stored in the traveling history storage part 26. Subsequently the history statistics part 27 extracts a traveling route having the same starting position as the starting position acquired at the Step S401 and extending toward the destination along the planned route from the first traveling history information extracted. Subsequently, the history statistics part 27 extracts another traveling route having the starting position that is the same as the destination of the traveling route extracted and extending toward the destination along the planned route from the extracted first traveling history information. Then the history statistics part 27 repeats the extraction of a traveling route, and finally extracts a traveling route having the same destination as the destination extracted at the Step S401. In this way, the history statistics part 27 synthesizes the extracted plurality of traveling routes to form a synthesized route. When there is no appropriate traveling route in a plurality of pieces of the first traveling history information stored in the traveling history storage part 26, the history statistics part 27 abandons the formation of a synthesized route.

Subsequently the procedure shifts to Step S408, where the history statistics part 27 determines whether a synthesized route can be formed or not at the Step S407 stated above. Then, when the history statistics part 27 determines that a synthesized route can be formed (Yes), the procedure shifts to Step S409. On the other hand, when the history statistics part 27 determines that a synthesized route cannot be formed (abandons the formation of a synthesized route) (No), the procedure shifts to Step S411.

At the Step S409, the history statistics part 27 extracts the charging location along the route that the vehicle passes by during traveling along each traveling route making up the synthesized route formed at the Step S407 from the second traveling history information (charging location along the route) stored in the traveling history storage part 26. For instance, the history statistics part 27 searches for a plurality of pieces of the first traveling history information including the traveling routes making up the synthesized route formed at the Step S407 from the first traveling history information stored in the traveling history storage part 26. Subsequently, the history statistics part 27 extracts a charging location along the route from each piece of the second traveling history information associated with the searched first traveling history information from the second traveling history information (charging locations along the route) stored in the traveling history storage part 26. Then the history statistics part 27 sets each of the extracted charging locations along the route as the charging location along the route that the vehicle passes by during traveling along the synthesized route formed at the Step S407.

Subsequently the procedure shifts to Step S410, where the history statistics part 27 extracts the power consumed during traveling along each traveling route making up the synthesized route formed at the Step S407 from the first traveling history information (power consumption) stored in the traveling history storage part 26. For instance, the history statistics part 27 extracts the power consumption from each of the plurality of pieces of the first traveling history information including the traveling routes making up the synthesized route formed at the Step S407. Subsequently, the history statistics part 27 sets the total of the extracted power consumption as the power consumed during traveling along the synthesized route formed at the Step S407, and then the procedure shifts to Step S413.

In this way, the present embodiment is configured so that the history statistics part 27 synthesizes a plurality of traveling routes along which the same vehicle traveled from the first traveling history information stored in the traveling history storage part 26 to forma synthesized route. Subsequently the history statistics part 27 extracts the charging location along the route that the vehicle passes by during the traveling routes making up the synthesized route from the second traveling history information stored in the traveling history storage part 26. Subsequently the history statistics part 27 extracts the power consumed during traveling along the traveling routes making up the synthesized route from the first traveling history information stored in the traveling history storage part 26. This means that, even when there is no traveling route (similar route) that is the same as or similar to the planned route in the first traveling history information stored in the traveling history storage part 26, more suitable power consumption and such a charging location along the route can be acquired.

Figure 9:
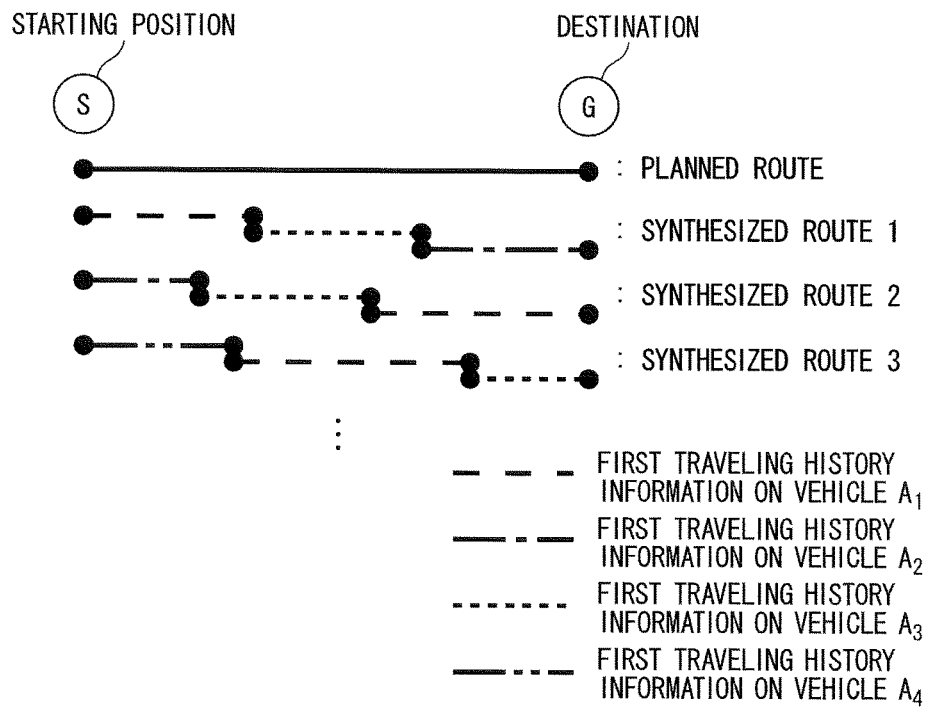
FIG. 9 describes a modification example of the synthesized route.

FIG. 9 describes a modification example of the synthesized route.

The present embodiment describes the example where the history statistics part 27 refers to the first traveling history information stored in the traveling history storage part 26 to synthesize a plurality of traveling routes along which the same vehicle traveled and forms a synthesized route, but another configuration may be used. For instance, as illustrated in FIG. 9, a plurality of traveling routes along which a plurality of vehicles traveled may be synthesized by referring to the first traveling history information stored in the traveling history storage part 26 for forming a synthesized route.

Meanwhile, at the Step S411 stated above, the history statistics part 27 calculates the power (hereinafter this may be called theoretical power consumption) consumed during traveling along the planned route searched at the Step S401 on the basis of the theoretical performance of the own vehicle A. Specifically the history statistics part 27 sets the result of multiplication of predetermined power consumption per unit distance with the total length of the planned route as the theoretical power consumption.

Subsequently the procedure shifts to Step S412, where the history statistics part 27 extracts the location of a charging facility C existing in the vicinity of the planned route searched at the Step S401 on the basis of the map information stored in the map information storage part 25, and then the procedure shifts to the Step S415. The charging facility C existing in the vicinity of the planned route may be a charging facility C existing along the planned route or a charging facility C located within a set distance (e.g., 20 m) from the planned route.

At the Step S413 stated above, the history statistics part 27 executes charging location along the route extraction processing on the basis of the remaining battery power acquired at the Step S402. In the charging location along the route extraction processing, the history statistics part 27 extracts a charging location along the route to be transmitted (provided) to the terminal device 2 as the source of transmission from the charging locations along the route acquired at the Steps S405, S409 or S412. The terminal device 2 as the source of transmission may be a terminal device 2 as the source of transmission of provided route searching request that triggers the starting of this history statistical processing, for example. In the charging location along the route extraction processing, the possibility that the vehicle A cannot reach the destination is determined as well, and when it is determined that the vehicle may not reach the destination, the issuance of a not-reachable warning that warns as such is determined. The details of the charging location along the route extraction processing are described later.

Subsequently the procedure shifts to Step S414, where the history statistics part 27 executes power consumption correction processing on the basis of a power consumption tendency of the driver of the vehicle A. In the power consumption correction processing, the history statistics part 27 refers to the first traveling history information of the driver that is identified with the driver ID included in the provided route searching request in the first traveling history information stored in the traveling history storage part 26, and calculates the power consumed during traveling along the provided route (similar route, synthesized route). Subsequently the history statistics part 27 corrects the power consumption extracted at the Step S406, S410 or S411 on the basis of the calculated power consumption. The details of the power consumption correction processing are described later.

At the Step S415 stated above, the history statistics part 27 transmits (provides) information on the provided route (similar route, synthesized route) extracted at the Step S403 or 407, the charging location along the route extracted at the Step S413 and the power consumption corrected at the Step S414 to the terminal device 2 as the source of transmission, and finishes this calculation processing. When the history statistics part 27 cannot extract a provided route at the Step S403, 407, then the history statistics part 27 transmits information on the planned route searched at the Step S401, the charging location along the route extracted at the Step S413 and the power consumption (theoretical power consumption) calculated at the Step S412. When the issuance of a not-reachable warning is determined at the Step S413, the history statistics part 27 transmits (provides) a control instruction to display the not-reachable warning as well to the terminal device 2 as the source of transmission.

The present embodiment describes the example where information on the charging location along the route extracted at the Step S413 and the power consumption corrected at the Step S414 is transmitted (provided) to the terminal device 2 as the source of transmission, but another configuration may be used. For instance, it may be configured to transmit (provide) information on the charging location along the route acquired at the Step S405, S409 or S412 and the power consumption before the correction at the Step S414 to the terminal device 2 as the source of transmission.

Next, the following describes the charging location along the route extraction processing executed by the history statistics part 27. When the procedure shifts to Step S413 in the history statistical processing, the history statistics part 27 executes the charging location along the route extraction processing.

Figure 10:
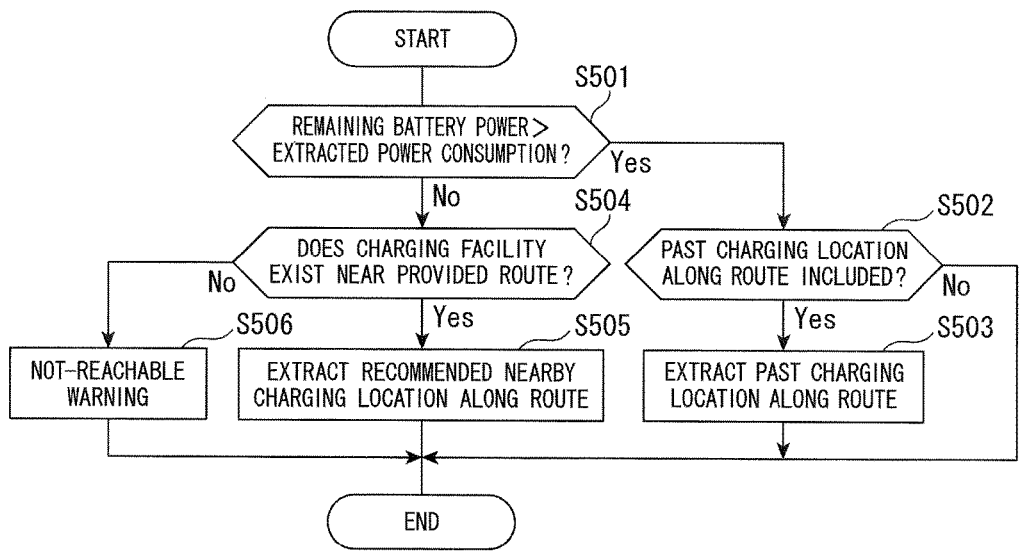
FIG. 10 is a flowchart illustrating charging location along the route extraction processing.

FIG. 10 is a flowchart illustrating the charging location along the route extraction processing.

As illustrated in FIG. 10, at the Step S501 stated above, the history statistics part 27 determines whether the remaining battery power acquired at the Step S402 is larger or not than the power consumption (hereinafter this may be called extracted power consumption) that is extracted at the Step S406, S410 or S411. Then, when the history statistics part 27 determines that the remaining battery power is larger than the extracted power consumption (Yes), the procedure shifts to Step S502. On the other hand, when the history statistics part 27 determines that the remaining battery power is the extracted power consumption or less (No), the procedure shifts to Step S504.

At the Step S502 stated above, the history statistics part 27 refers to the second traveling history information (charging location along the route) stored in the traveling history storage part 26 to determine whether the charging location along the route acquired at the Step S405, S409 or S412 includes the past charging location along the route or not. The past charging location along the route may be the location of a charging location C where charging was actually performed for at least one of the plurality of vehicles A. Then, when the history statistics part 27 determines that it includes the past charging location along the route (Yes), the procedure shifts to Step S503 to extract the past charging location along the route. On the other hand, when the history statistics part 27 determines that it does not include the past charging location along the route (No), the extraction of a past charging location along the route is not performed, and this calculation processing ends. This means that, if the remaining battery power of the battery for traveling 14 is enough and the charging location along the route acquired at the Step S405, S409 or S412 does not include the past charging location along the route, the history statistics part 27 does not transmit (provide) information on the past charging location along the route to the terminal device 2 as the source of transmission.

At the Step S503 stated above, the history statistics part 27 refers to the second traveling history information (charging location along the route) stored in the traveling history storage part 26, and extracts a past charging location along the route from the charging location along the route acquired at the Step S405, S409 or S412, and then finishes this calculation processing. This means that, when the remaining battery power of the battery for traveling 14 is enough and the charging location along the route acquired at the Step S405, S409 or S412 includes the past charging location along the route, the history statistics part 27 transmits (provides) information on the past charging location along the route only to the terminal device 2 as the source of transmission.

Meanwhile at the Step S504, the history statistics part 27 determines whether a charging location C exists or not in the vicinity of the provided route (similar route, synthesized route) extracted at the Step S403 or S407 on the basis of the map information stored in the map information storage part 25. The charging facility C existing in the vicinity of the planned route may be a charging facility C existing along the provided route or a charging facility C located within a set distance (e.g., 20 m) from the provided route. Then, when the history statistics part 27 determines that a charging location C exists in the vicinity of the provided route (Yes), the procedure shifts to Step S505. On the other hand, when the history statistics part 27 determines that a charging location C does not exist in the vicinity of the provided route (No), the procedure shifts to Step S506.

When any provided route cannot be extracted at the Step S403 or S407, the history statistics part 27 determines whether a charging location C exists or not in the vicinity of the planned route searched at the Step S401 on the basis of the map information stored in the map information storage part 25. Then, when the history statistics part 27 determines that a charging location C exists in the vicinity of the planned route (Yes), the procedure shifts to Step S505. On the other hand, when the history statistics part 27 determines that a charging location C does not exist in the vicinity of the planned route (No), the procedure shifts to Step S506.

At the Step S505 stated above, the history statistics part 27 extracts the location (hereinafter this may be called a recommended nearby charging location along the route) of the charging location C located in the vicinity of the provided route (similar route, synthesized route) on the basis of the map information stored in the map information storage part 25, and then finishes this calculation processing. When any provided route cannot be extracted at the Step S403, S407, the history statistics part 27 extracts a recommended nearby charging location along the route located in the vicinity of the planned route on the basis of the map information stored in the map information storage part 25. This allows the history statistics part 27 to transmit (provide) information on the recommended nearby charging location along the route only to the terminal device 2 as the source of transmission when the remaining battery power of the battery for traveling 14 is not enough and there is a nearby charging location along the route.

Meanwhile at the Step S506 stated above, the history statistics part 27 determines the issuance of a not-reachable warning, and then finishes this calculation processing. This means that the history statistics part 27 does not to transmit (provide) information on a recommended nearby charging location along the route to the terminal device 2 as the source of transmission when the remaining battery power of the battery for traveling 14 is not enough and there is no nearby charging location along the route.

Next the following describes the consumption power correction processing executed by the history statistics part 27. When the procedure shifts to Step S414 in the history statistical processing, the history statistics part 27 executes the consumption power correction processing.

Figure 11:
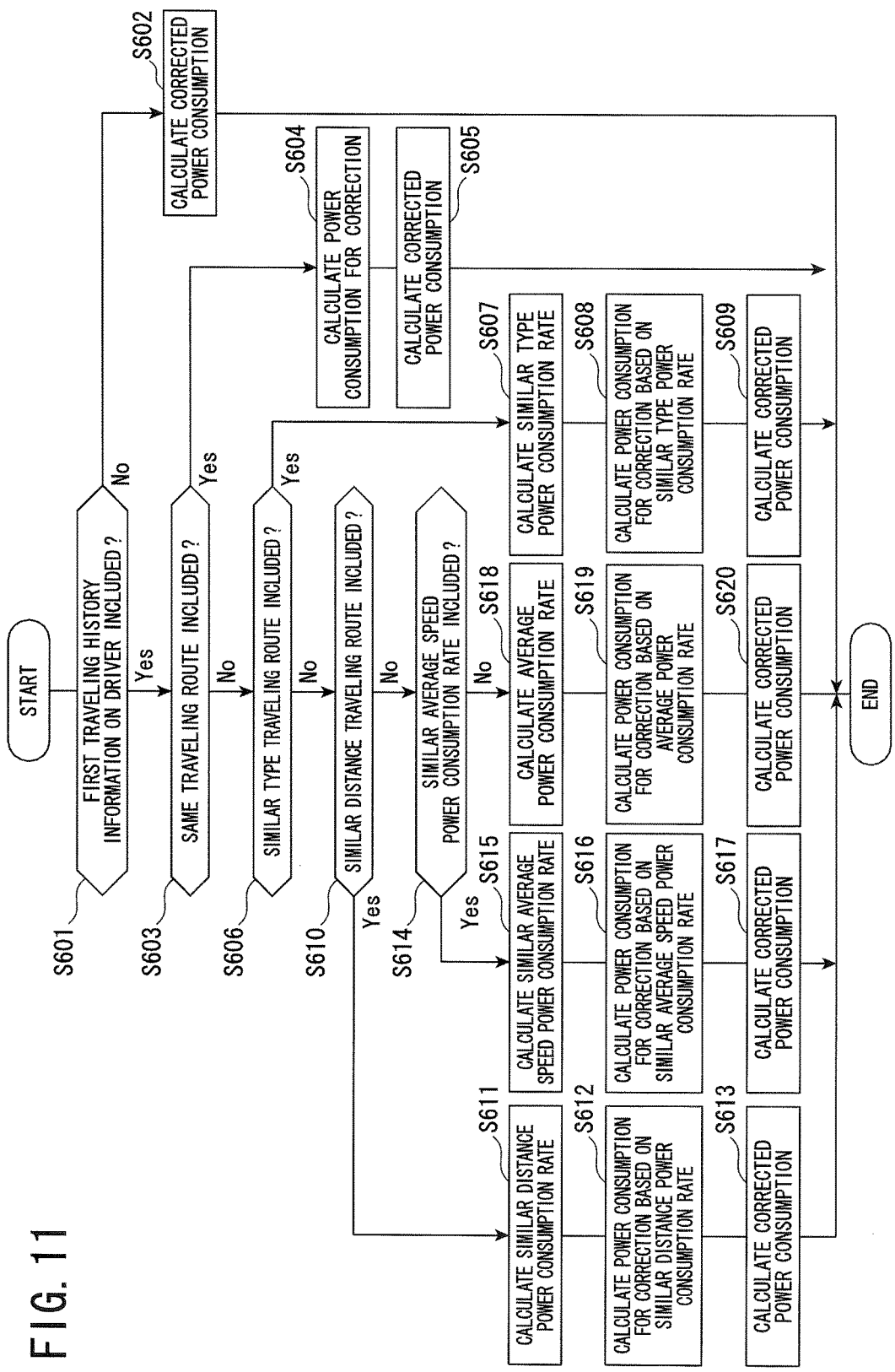
FIG. 11 is a flowchart illustrating consumption power correction processing.

FIG. 11 is a flowchart illustrating the consumption power correction processing.

As illustrated in FIG. 11, at the Step S601 stated above, the history statistics part 27 acquires a driver ID (information identifying the driver) from the received provided route searching request. Subsequently the history statistics part 27 determines whether the first traveling history information stored in the traveling history storage part 26 includes or not the first traveling history information (hereinafter this may be called transmission source traveling history information) including the same driver ID as the acquired driver ID. Then when the history statistics part 27 determines that transmission source traveling history information is included (Yes), the procedure shifts to Step S603. On the other hand, when the history statistics part 27 determines that transmission source traveling history information is not included (No), the procedure shifts to Step S602.

At the Step S602 stated above, the history statistics part 27 sets the power consumption calculated at the Step S406, S410 or S411 as it is as the power consumption subjected to correction (hereinafter this may be called corrected power consumption), and then finishes this calculation processing. This means that the history statistics part 27 transmits (provides) information on the power consumption calculated at the Step S406, S410 or S411 as it is to the terminal device 2 as the source of transmission when the first traveling history information stored in the traveling history storage part 26 does not include transmission source traveling history information.

Meanwhile at the Step S603 stated above, the history statistics part 27 determines whether the transmission source traveling history information (traveling routes) stored in the traveling history storage part 26 includes or not the same traveling route (hereinafter this may be called a same traveling route) as the similar route extracted at the Step S403. When the history statistics part 27 determines that it includes the same traveling route (Yes), the procedure shifts to Step S604. When the history statistics part 27 determines that it does not include the same traveling route (No), the procedure shifts to Step S606.

At the Step S604 stated above, the history statistics part 27 extracts the power consumed during traveling along the same traveling route from the transmission source traveling history information stored in the traveling history storage part 26. Subsequently the history statistics part 27 sets the extracted power consumption as power consumption for correction.

Subsequently the procedure shifts to Step S605, where the history statistics part 27 corrects the power consumption calculated at the Step S406, S410 or S411 on the basis of the power consumption for correction calculated at the Step S604. A method for correction of the power consumption may include a method to substitute the power consumption with the power consumption for correction, a method to calculate an average of the power consumption and the power consumption for correction, and a method to use the difference c between the power consumption b and the power consumption for correction a to represent it as a±c, for example. Subsequently the history statistics part 27 sets the corrected power consumption as the corrected power consumption and then finishes this calculation processing. This means that the history statistics part 27 performs the correction with the power consumed during traveling along the same traveling route when the transmission source traveling history information stored in the traveling history storage part 26 includes the same traveling route, and transmits (provides) the corrected power consumption to the terminal device 2 as the source of transmission.

Meanwhile, at the Step S606 stated above, the history statistics part 27 determines whether the transmission source traveling history information (traveling routes) stored in the traveling history storage part 26 includes or not a similar type traveling route. The similar type traveling route may be a traveling route of the same or similar road type to that of the type of the provided route (similar route, synthesized route) extracted at the Step S403 or S407, for example. When any provided route cannot be extracted at the Step S403, 407, a traveling route of the same or similar road type to that of the type of the planned route searched at the Step S401 may be set as the similar type traveling route. Then, when the history statistics part 27 determines that the similar type traveling route is included (Yes), the procedure shifts to Step S607. On the other hand, when the history statistics part 27 determines that the similar type traveling route is not included (No), the procedure shifts to Step S610.

At the Step S607 stated above, the history statistics part 27 refers to the transmission source traveling history information stored in the traveling history storage part 26, and calculates the power consumption per unit distance of the similar type traveling route (hereinafter this may be called a similar type power consumption rate).

Subsequently the procedure shifts to Step S608, where the history statistics part 27 multiplies the similar type power consumption rate calculated at the Step S607 with the total length of the planned route. Then, the history statistics part 27 sets the result of multiplication as the power consumption for correction.

Subsequently the procedure shifts to Step S609, where the history statistics part 27 corrects the power consumption calculated at the Step S406, S410 or S411 on the basis of the power consumption for correction calculated at the Step S608. A method for the correction of power consumption is similar to that at the Step S605. Subsequently, the history statistics part 27 sets the corrected power consumption as the corrected power consumption and then finishes this calculation processing. This means that the history statistics part 27 corrects the power consumption with the similar type power consumption rate when the transmission source traveling history information stored in the traveling history storage part 26 includes the similar type traveling route, and transmits (provides) the corrected power consumption to the terminal device 2 as the source of transmission.

Meanwhile at the Step S610 stated above, the history statistics part 27 determines whether the transmission source traveling history information (traveling routes) stored in the traveling history storage part 26 includes or not a similar distance traveling route. The similar distance traveling route may be a traveling route having the same or similar total length to the provided route (similar route, synthesized route) extracted at the Step S403 or S407, for example. When any provided route cannot be extracted at the Step S403, 407, a traveling route having the same or similar total length to that of the planned route searched at the Step S401 may be set as the similar distance traveling route. For instance, the history statistics part 27 determines whether the transmission source traveling history information (traveling route) stored in the traveling history storage part 26 includes or not a traveling route with a difference from the total length of the provided route that is less than a set value (e.g., ±100 m). Then, when the history statistics part 27 determines that the similar distance traveling route is included (Yes), the procedure shifts to Step S611. On the other hand, when the history statistics part 27 determines that the similar distance traveling route is not included (No), the procedure shifts to Step S614.

At the Step S611 stated above, the history statistics part 27 refers to the transmission source traveling history information stored in the traveling history storage part 26, and calculates power consumption per unit distance of the similar distance traveling route (hereinafter this may be called a similar distance power consumption rate).

Subsequently the procedure shifts to Step S612, where the history statistics part 27 multiplies the similar distance power consumption rate calculated at the Step S611 with the total length of the planned route. Then, the history statistics part 27 sets the result of the multiplication as the power consumption for correction.

Subsequently the procedure shifts to Step S613, where the history statistics part 27 corrects the power consumption calculated at the Step S406, S410 or S411 on the basis of the power consumption for correction calculated at the Step S612. A method for the correction of power consumption is similar to that at the Step S605. Subsequently, the history statistics part 27 sets the corrected power consumption as the corrected power consumption and then finishes this calculation processing. This means that the history statistics part 27 corrects the power consumption with the similar type power consumption rate when the transmission source traveling history information stored in the traveling history storage part 26 includes the similar distance traveling route, and transmits (provides) the corrected power consumption to the terminal device 2 as the source of transmission.

Meanwhile at the Step S614 stated above, the history statistics part 27 determines whether the transmission source traveling history information (traveling routes) stored in the traveling history storage part 26 includes or not a similar average speed traveling route. The similar average speed traveling route may be a traveling route with the average rate that is the same as or similar to the average speed of the provided route (similar route, synthesized route) extracted at the Step S403 or S407, for example. When any provided route cannot be extracted at the Step S403, 407, a traveling route with the same or similar average speed to that of the planned route searched at the Step S401 may be set as the similar average speed traveling route. For instance, the history statistics part 27 determines whether the transmission source traveling history information (traveling routes) stored in the traveling history storage part 26 includes or not a traveling route having a difference from the average speed of the provided route that is less than a set value (e.g., ±5 km/h). Then, when the history statistics part 27 determines that the similar average speed traveling route is included (Yes), the procedure shifts to Step S615. On the other hand, when the history statistics part 27 determines that the similar average speed traveling route is not included (No), the procedure shifts to Step S618.

At the Step S615, the history statistics part 27 refers to the transmission source traveling history information stored in the traveling history storage part 26, and calculates the power consumption per unit distance of the similar average speed traveling route (hereinafter this may be called a similar average speed power consumption rate).

Subsequently the procedure shifts to Step S616, where the history statistics part 27 multiplies the similar average speed power consumption rate calculated at the Step S615 with the total length of the planned route. Then, the history statistics part 27 sets the result of the multiplication as the power consumption for correction.

Subsequently the procedure shifts to Step S617, where the history statistics part 27 corrects the power consumption calculated at the Step S406, S410 or S411 on the basis of the power consumption for correction calculated at the Step S616. A method for the correction of power consumption is similar to that at the Step S605. Subsequently, the history statistics part 27 sets the corrected power consumption as the corrected power consumption and then finishes this calculation processing. This means that the history statistics part 27 corrects the power consumption with the similar average speed power consumption rate when the transmission source traveling history information stored in the traveling history storage part 26 includes the similar average speed traveling route, and transmits (provides) the corrected power consumption to the terminal device 2 as the source of transmission.

Meanwhile at the Step S618 stated above, the history statistics part 27 refers to the transmission source traveling history information stored in the traveling history storage part 26, and calculates an average (hereinafter this may be called an average power consumption rate) of the power consumption per unit distance of the traveling routes of all pieces of transmission source traveling history information.

Subsequently the procedure shifts to Step S619, where the history statistics part 27 multiplies the average power consumption rate calculated at the Step S618 with the total length of the planned route. Then, the history statistics part 27 sets the result of the multiplication as the power consumption for correction.

Subsequently the procedure shifts to Step S620, where the history statistics part 27 corrects the power consumption calculated at the Step S406, S410 or S411 on the basis of the power consumption for correction calculated at the Step S619. A method for the correction of power consumption is similar to that at the Step S605. Subsequently, the history statistics part 27 sets the corrected power consumption as the corrected power consumption and then finishes this calculation processing. This means that, when the determinations at the Step S603, S606, S610 and S614 are all "No", the history statistics part 27 corrects the power consumption with the average power consumption rate, and transmits (provides) the corrected power consumption to the terminal device 2 as the source of transmission.

In this way, the present embodiment is configured so that the history statistics part 27 calculates the power consumed during traveling along the searched planned route on the basis of the first traveling history information of the designated driver in the first traveling history information stored in the traveling history storage part 26. Subsequently the history statistics part 27 corrects the extracted power consumption on the basis of the calculated power consumption. Subsequently the history statistics part 27 provides information on the corrected power consumption. This enables the acquisition of power consumption with consideration given to the driving characteristics of the driver. This can provide more suitable information on the power consumption.

(Operation and Others)

Next, the following describes the operation of the information provision system S.

Firstly the operation to store traveling history information in the traveling history storage part 26 is described below.

Let that the driver turns the ignition switch of the vehicle A ON. Then, the in-vehicle device 1 of the vehicle A determines that the driver starts the driving (Step S101 of FIG. 3, "Yes"). Subsequently the in-vehicle device 1 records the information output from the various detection parts 4 to 11 (driver ID, air-temperature, date and time, latitude and longitude, height, traveling route (traveling location information), vehicle-speed, accelerator position, amount of air-conditioner use) in the traveling history recording part 19

(Steps S102 to S104 of FIG. 3). At this time, the vehicle ID and the power consumed during traveling along the traveling route (power consumption information) also are recorded in the traveling history recording part 19. Subsequently, the in-vehicle device 1 transmits the information recorded in the traveling history recording part 19 to the information provision device 3 as first traveling history information (Step S105 of FIG. 3). Then, the in-vehicle device 1 repeatedly executes the procedure of Steps S102 to S105 of FIG. 3 as stated above (Step S106 "No"). This means that the in-vehicle device 1 sequentially transmits the first traveling history information of the vehicle A to the information provision device 3. Then the information provision device 3 sequentially receives (acquires) the first traveling history information that the in-vehicle devices 1 of a plurality of vehicles A transmit to store the same in the traveling history storage part 26 as the traveling history information (Step S301 of FIG. 5).

Then let that after stopping the vehicle A at a charging facility C and turning the ignition switch of the vehicle A OFF, the driver starts charging of the battery for traveling 14. Then the in-vehicle device 1 of the vehicle A determines that the driver finishes the driving (Step S106 of FIG. 3 "Yes"). Subsequently the in-vehicle device 1 determines that the charging of the battery for traveling 14 starts (Step S107 of FIG. 3, "Yes"). Subsequently the in-vehicle device 1 records the information output from the various detection parts 4 to 11 (air-temperature, date and time, latitude and longitude (charging location information), amount of charging, charging time) in the traveling history recording part 19 (Steps S108, S109 of FIG. 3). Subsequently, the in-vehicle device 1 transmits the information recorded in the traveling history recording part 19 to the information provision device 3 as second traveling history information (Step S110 of FIG. 3). Then, the in-vehicle device 1 repeatedly executes the procedure of Steps S108 to S110 of FIG. 3 as stated above (Step S111 "No"). This means that the in-vehicle device 1 sequentially transmits the second traveling history information of the vehicle A to the information provision device 3. Then the information provision device 3 sequentially receives (acquires) the second traveling history information that the in-vehicle devices 1 of a plurality of vehicles A transmit to store the same in the traveling history storage part 26 as the traveling history information (Step S301 of FIG. 5). Then the information provision device 3 stores the traveling location information, the power consumption information and the charging location information that the in-vehicle devices 1 of the plurality of vehicles A transmit as the traveling history information.

Next, the following describes the operation to provide a provided route, power consumed during traveling along the provided route and a charging location along the route that the vehicle passes by during traveling along the provided route.

Let that the user of the terminal device 2 manipulates the terminal device 2 (destination input part 22) to input a starting position, a destination, a remaining battery power (remaining battery power of the vehicle A that the user has), and the driver ID (driver ID identifying the user). Then the route calculation part 23 acquires information output from the destination input part 22 (Step S201 of FIG. 4). Subsequently the terminal device 2 transmits a provided route searching request to the information provision device 3 (Step S202 of FIG. 4).

When the terminal device 2 transmits the provided route searching request, the information provision device 3 acquires the starting position, the destination and the remaining battery power from the provided route searching request (Step S401, S402 of FIG. 6). Subsequently the information provision device 3 searches for a planned route from the starting position to the destination on the basis of the provided route searching request and map information stored in the map information storage part 25 (Step S401 of FIG. 6). Subsequently the information provision device 3 extracts a similar route that is the same as or similar to the planned route from the first traveling history information stored in the traveling history storage part 26 on the basis of the searched planned route (Step S403 of FIG. 6).

Let that the information provision device 3 successfully extracted a similar route. Then, the history statistics part 27 extracts a charging location along the route that the vehicle passes by during the traveling along the extracted similar route from the second traveling history information (Step S404 of FIG. 6, "Yes", S405). Subsequently the information provision device 3 extracts power consumed during traveling along the extracted similar route from the first traveling history information (Step S406 of FIG. 6). Herein assume that the power consumption extracted (extracted power consumption) is smaller than the remaining battery power of the battery for traveling 14 of the vehicle A. Then, the information provision device 3 extracts a past charging location along the route from the extracted charging location along the route (Step S413 of FIG. 5, Step S501 of FIG. 10 "Yes", S502 "Yes", S503). Subsequently the information provision device 3 corrects the extracted power consumption on the basis of the power consumption tendency of the user (driver) of the terminal device 2 (Step S414 of FIG. 6). Subsequently the information provision device 3 transmits (provides) the information on the extracted similar route, the extracted past charging location along the route and the corrected power consumption to the terminal device 2 (Step S415 of FIG. 6).

When the information provision device 3 transmits information on the similar route, the power consumption and the charging location along the route, the terminal device 2 receives this information (Step S203 of FIG. 4). Then as illustrated in FIG. 2, the terminal device 2 displays the similar route, the power consumption and the charging location along the route on a display screen on the basis of the received information (Step S204 of FIG. 4, "Yes", S205, S206). This means that the terminal device 2 (display part 24) displays the power actually consumed by the vehicle A during traveling along the similar route and the actual charging location along the route that the vehicle passes by. Then, the user of the terminal device 2 can confirm the power consumption during driving of the vehicle A to the destination and the charging location along the route beforehand.

In this way, the present embodiment is configured so that the information provision device 3 sequentially acquires at least one of the traveling location information, the power consumption information and the charging location information from the in-vehicle device 1 mounted on the vehicle A including the electric motor 13 as a driving source and stores the same as traveling history information (first traveling history information, second traveling history information). Then the information provision device 3 refers to the stored first traveling history information and determines a provided route (similar route, synthesized route) that is the same as or similar to a planned route. Subsequently, the information provision device 3 refers to the stored first traveling history information and second traveling history information and determines the power consumed during traveling along the determined provided route and the charging location along the route that the vehicle passes by during traveling along the provided route. Subsequently the information provision device 3 provides information on the determined provided route as well as information on the determined power consumption and charging location along the route. This allows information on the power consumption and the charging location along the route corresponding to the actual environment to be provided.

The present embodiment describes the example where the information provision device 3 determines (extracts) both of the power consumption and the charging location along the route during actual traveling by the vehicle A along the similar route, but another configuration may be used. For instance, the information provision device 3 may be configured to determine at least one of the power consumption and the charging location along the route. In this case, the information provision device 3 transmits (provides) the determined power consumption or charging location along the route only as well as the provided route.

In the present embodiment, the in-vehicle device 1 of FIG. 1 makes up an in-vehicle device. Similarly, the traveling history storage part 26 of FIG. 1 makes up a history information storage part. The history statistics part 27 of FIG. 1 and Step S401 of FIG. 6 make up a planned route acquisition part. The history statistics part 27 of FIG. 1, and Steps S403, S407 of FIG. 6 make up a provided route determination part. The history statistics part 27 of FIG. 1, and Steps S405, S406, S409 and S410 of FIG. 6 make up a provided information determination part. The route calculation part 23 of FIG. 1 and Step S415 of FIG. 4 make up a provided information provision part. The destination input part 22 of FIG. 1 makes up a driver designation part. The history statistics part 27 of FIG. 1 and Steps S604, S608, S612, S616 and S619 of FIG. 6 make up a power consumption for correction calculation part. The history statistics part 27 of FIG. 1, and Step S605, S609, S613, S617 and S620 of FIG. 6 make up a power consumption correction part.

[Advantageous Effects of the Present Embodiment]

The present embodiment has advantageous effects as follows.

(1) An information provision device 3 sequentially acquires at least one of traveling location information, power consumption information and charging location information from an in-vehicle device 1 mounted on a vehicle A including an electric motor 13 as a driving source and stores the same as traveling history information (first traveling history information, second traveling history information). Then the information provision device 3 refers to the stored first traveling history information and determines a provided route (similar route, synthesized route) that is the same as or similar to a planned route. Subsequently, the information provision device 3 refers to the stored first traveling history information and second traveling history information and determines power consumed during traveling along the determined provided route and a charging location along the route that the vehicle passes by during traveling along the provided route. Subsequently the information provision device 3 provides information on the determined provided route as well as at least one piece of information on the determined power consumption and charging location along the route.

This configuration enables the determination of the power consumption and the charging location along the route during the traveling by the vehicle A by referring to traveling history information, i.e., information obtained from the actual traveling with the vehicle A. This means that information on the power consumption and the charging location along the route corresponding to the actual environment can be provided.

(2) The information provision device 3 extracts a provided route (similar route) that is the same as or similar to a planned route searched from the stored first traveling history information. Subsequently the information provision device 3 extracts at least one of the power consumed during traveling along the extracted provided route (similar route) and the charging location along the route that the vehicles passes by during the traveling along the provided route (similar route) from the stored traveling history information.

This configuration allows more suitable power consumption and such a charging location along the route to be acquired. This means that information on the power consumption and the charging location along the route corresponding to the actual environment more can be provided.

(3) The information provision device 3 forms a synthesized route by synthesizing a plurality of traveling routes along which the same vehicle traveled in the first traveling history information stored. Subsequently the information provision device 3 extracts the power consumed during traveling along each traveling route making up the synthesized route and the charging location along the route that the vehicle passes by during the traveling along each traveling route making up the synthesized route from the first traveling history information and the second traveling history information stored.

This configuration allows, even when there is no traveling route (similar route) that is the same as or similar to the planned route in the stored first traveling history information, power consumption and a charging location along the route to be acquired. This means that more suitable information on the power consumption and the charging location along the route can be provided.

(4) The information provision device 3 forms a synthesized route by synthesizing a plurality of traveling routes along which a plurality of vehicles traveled in the first traveling history information stored. Subsequently the information provision device 3 extracts the power consumed during traveling along each traveling route making up the synthesized route and the charging location along the route that the vehicle passes by during the traveling along each traveling route making up the synthesized route from the first traveling history information and the second traveling history information stored.

This configuration allows, even when there is no traveling route (similar route) that is the same as or similar to the planned route in the stored traveling history information, power consumption and a charging location along the route to be acquired. This means that more suitable information on the power consumption and the charging location along the route can be provided.

(5) The information provision device 3 calculates the power consumed during traveling along the searched planned route on the basis of the first traveling history information of a designated driver in the first traveling history information stored. Subsequently the information provision device 3 corrects the extracted power consumption on the basis of the calculated power consumption. Subsequently the information provision device 3 provides information on the corrected power consumption.

This configuration enables the acquisition of power consumption with consideration given to the driving characteristics of the driver. This can provide more suitable information on the power consumption.

[Modification Example 1]

Figure 12:
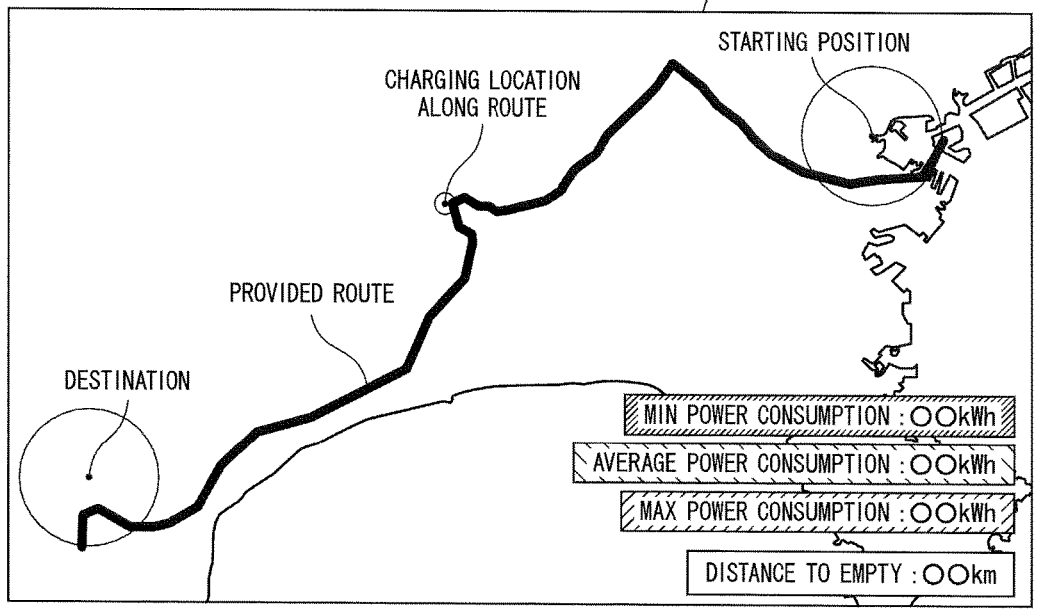
FIG. 12 illustrates the contents displayed on the display part 24.

FIG. 12 illustrates the contents displayed on the display part 24.

The present embodiment may be configured so that the history statistics part 27 refers to the first traveling history information stored in the traveling history storage part 26 and determines the power consumed during traveling along the provided route (similar route, synthesized route) for each driver. In this case, the history statistics part 27 transmits (provides), in addition to information on the provided route and the charging location along the route, information on the maximum power consumption (e.g., power consumed during traveling by driver A), the minimum power consumption (e.g., power consumed during traveling by driver B) and average power consumption (average power consumption including all drivers including drivers A and B) to the terminal device 2 as the source of transmission among the determined power consumption values for the drivers. Then as illustrated in FIG. 12, the terminal device 2 as the source of transmission displays, in addition to the provided route and the charging location along the route, the maximum power consumption (power consumption MAX), the minimum power consumption (power consumption MIN) and average power consumption (average power consumption) on the display screen on the basis of the received information.

This modification example has the following advantageous effects in addition to (1) to (5) of Embodiment 1. (1) The information provision device 3 refers to the stored first traveling history information, and determines the power consumed during traveling along the determined provided route (similar route, synthesized route) for each driver. Subsequently, the information provision device 3 provides information on the maximum power consumption, the minimum power consumption and the average power consumption among the determined power consumption for each driver.

This configuration calculates the power consumed during traveling along the provided route for each driver, and provides the maximum power consumption, the minimum power consumption and the average power consumption among the determined power consumption. This allows a user to understand variation of the power consumption among the drivers.

[Modification Example 2]

Figure 13:
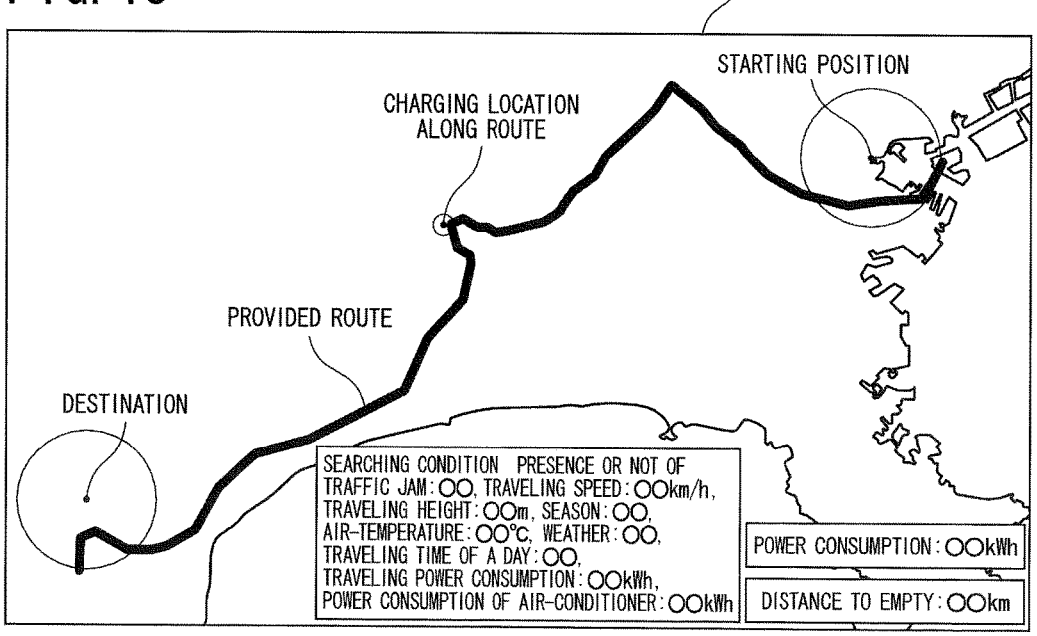
FIG. 13 illustrates the contents displayed on the display part 24.

FIG. 13 illustrates the contents displayed on the display part 24.

The present embodiment describes the example where the display part 24 displays the power consumption and the charging location along the route in addition to the provided route (similar route, synthesized route), but another configuration may be used. For instance, the display part 24 may be configured to display information on the presence or not of a traffic jam, the traveling speed, the traveling height, the season, the air-temperature, the weather, the traveling time zone, the traveling power consumption and the power consumption of the air-conditioner as well, which are included in the first traveling history information and the second traveling history information used for extraction of the power consumption and the charging location along the route. Specifically the terminal device 2 receives the input of at least one of the presence or not of a traffic jam, the traveling speed, the traveling height, the season, the air-temperature, the weather, the traveling time zone, the traveling power consumption and the power consumption of the air-conditioner (hereinafter this may be called a state quantity for searching). Subsequently the terminal device 2 transmits information on the received state quantity for searching to the information provision device 3. Subsequently the information provision device 3 (history statistics part 27) receives the information transmitted from the terminal device 2, and acquires the state quantity as a searching condition from the received information as a searching condition. Subsequently the history statistics part 27 refers to traveling history information matching with the acquired searching condition among the traveling history information stored in the traveling history storage part 26, and determines the power consumed during traveling along the determined provided route and the charging location along the route that the vehicle passes by during traveling along the provided route. Subsequently the history statistics part 27 transmits (provides) information on the acquired searching condition as well as the information on the provided route (similar route, synthesized route), the power consumption and the charging location along the route to the terminal device 2 as the source of transmission. Then as illustrated in FIG. 13, the terminal device 2 as the source of transmission displays, in addition to the provided route and the charging location along the route, the searching condition used for determination on the power consumption and the charging location along the route on the display screen on the basis of the received information.

In the present embodiment, the history statistics part 27 makes up a driver information acquisition part.

This modification example has the following advantageous effects in addition to (1) to (5) of Embodiment 1. (1) The history statistics part 27 acquires, as a searching condition, at least one of the presence or not of a traffic jam, the traveling speed, the traveling height, the season, the air-temperature, the weather, the traveling time zone, the traveling power consumption and the power consumption of the air-conditioner. Subsequently, the history statistics part 27 refers to traveling history information matching with the acquired searching condition and determines at least one of the power consumption during traveling along the determined provided route (similar route, synthesized route) and the charging location along the route that the vehicle passes by during traveling along the route. Subsequently, the history statistics part 27 provides information on the determined provided route, at least one piece of information on the power consumption and the charging location along the route, and information on the searching condition.

This configuration provides, in addition to the provided route, the power consumption and the charging location along the route, the searching condition used for determination on the power consumption and the charging location along the route. This allows a user to understand the searching condition used for determination on the power consumption and the charging location along the route.

The explanation has been made by way of the limited number of embodiment. The scope of the claims is not limited to the above, and various modifications of the disclosed embodiments will be apparent to those skilled in the art.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 1 in-vehicle device (in-vehicle device)
22 destination input part (driver designation part))

23 route calculation part (provided information provision part))
26 traveling history storage part (history information storage part)
27 history statistics part (planned route acquisition part, provided route determination part, provided information determination part, power consumption for correction calculation part, power consumption correction part, driver information acquisition part)
Step S401 (planned route acquisition part)
Step S403, S407 (provided route determination part)
Step S405, S406, S409, S410 (provided information determination part)
Step S415 (provided information provision part)
Step S604, S608, S612, S616, S619 (power consumption for correction calculation part)
Step S605, S609, S613, S617, S620 (power consumption correction part)

The invention claimed is:

1. An information provision method, comprising:
sequentially acquiring traveling location information, power consumption information and charging location information, storing as traveling history information, and transmitting the traveling history information to an information provision device by an in-vehicle device mounted on a vehicle including an electric motor;
receiving the traveling history information transmitted by the in-vehicle device and storing by the information provision device;
acquiring a planned route from a starting position to a destination by the information provision device by a request of a terminal device;
comparing the traveling history information stored on the information provision device with the planned route and selecting a route that is as same as the planned route or a route having a difference from the planned route within a set distance, from traveling routes along which the vehicle traveled to be decided as a provision route by the information provision device;
extracting, from the stored traveling history information, a charging location along route that the vehicle passes by during traveling along the determined provided route by the information provision device;
transmitting the decided provision route and the charging location along route to the terminal device by the information provision device;
receiving the decided provision route and the charging location along route transmitted by the information provision device, displaying and providing information on a result of the determination to a driver of the vehicle by the terminal device so that the driver confirms the provision route and the charging location when driving the vehicle to a destination beforehand;
determining power consumed during traveling along the provided route for each driver based on the stored traveling history information by the information provision device;
transmitting information on maximum power consumption and minimum power consumption among the determined power consumption values for the drivers to the terminal device by the information provision device; and
displaying the maximum power consumption and the minimum power consumption based on the information transmitted by the information provision device by the terminal device so that a user understands variation of the power consumption among the drivers.

2. The information provision method according to claim 1, further comprising:
storing map information containing a location of a charging facility on the information provision device,
wherein, when extracting the provided route fails, the stored map information is referred, and a location of a charging facility in a vicinity of the acquired planned is extracted as a charging location along route, by the information provision device.

3. The information provision method according to claim 1, further comprising:
determining whether a remaining power of a battery for travelling that supplies electricity to the electric motor is larger or not than power consumed during traveling along the determined provided route by the information provision device,
wherein, when a remaining power of the battery for travelling is equal to or less than the power consumed is determined, and when a charging location along route is extracted, information on the extracted charging location along route is provided as information on a result of the determination by the information provision device.

4. The information provision method according to claim 1, further comprising:
acquiring information identifying a driver by the information provision device;
referring to traveling history information of a driver that is identified with the acquired information out of the stored traveling history information stored on the information provision device to calculate power consumption consumed during traveling along the provided route by the information provision device; and
correcting the determined power consumption on a basis of the calculated power consumption by the information provision device,
wherein information on the corrected power consumption is provided by the information provision device.

5. The information provision method according to claim 1, further comprising:
acquiring at least one of presence or not of a traffic jam, traveling speed, traveling height, season, air-temperature, weather, traveling time zone, traveling power consumption and power consumption of an air-conditioner as a searching condition by the information provision device,
wherein the traveling history information contains at least one of presence or not of a traffic jam, traveling speed, traveling height, season, air-temperature, weather, traveling time zone, traveling power consumption and power consumption of an air-conditioner,
wherein referring to traveling history information matching with the acquired searching condition out of the stored traveling history information and determining at least one of power consumption during traveling along the determined provided route and a charging location along route that the vehicle passes by during traveling along the determined provided route is determined by the information provision device, and
wherein providing information on the acquired searching condition as well as information on a result of the determination by the information provision device.

6. An information provision method, comprising:
sequentially acquiring traveling location information, power consumption information and charging location information, storing as travel history information, and transmitting the traveling history information to an information provision device by an in-vehicle device mounted on a vehicle including an electric motor;
receiving the traveling history information transmitted by the in-vehicle device and storing by the information provision device;
acquiring a planned route from a starting position to a destination by the information provision device by a request of a terminal device;
comparing the traveling history information stored on the information provision device with the planned route and selecting a route is a same as or similar to the acquired planned route, or a route having a difference from the acquired planned route within a set distance, from traveling routes along which the vehicle traveled to be decided as a provision route by the information provision device;
transmitting the decided provision route to the terminal device by the information provision device;
receiving the decided provision route transmitted by the information provision device, displaying and providing information on a result of the determination to a driver of the vehicle by the terminal device so that the driver confirms the provision route when driving the vehicle to a destination beforehand;
determining power consumed during traveling along the provided route for each driver based on the stored traveling history information by the information provision device;
transmitting information on maximum power consumption and minimum power consumption among the determined power consumption values for the drivers to the terminal device by the information provision device; and
displaying the maximum power consumption and the minimum power consumption based on the information transmitted by the information provision device by the terminal device so that a user understands variation of the power consumption among the drivers;
wherein the stored traveling history information stored on the information provision device is referred to synthesize a plurality of traveling routes along which a same vehicle traveled and a synthesized route is formed as the provided route by the information provision device, and
wherein, from the stored traveling history information stored on the information provision device, at least one of power consumed during traveling along each traveling route making up the synthesized route and a charging location along route that the vehicle passes by during traveling along each traveling route making up the synthesized route is extracted by the information provision device.

7. An information provision method, comprising:
sequentially acquiring traveling location information, power consumption information and charging location information, storing as traveling history information, and transmitting the traveling history information to an information provision device by an in-vehicle device mounted on a vehicle including an electric motor;
receiving the traveling history information transmitted by the in-vehicle device and storing by the information provision device;
acquiring a planned route from a starting position to a destination by the information provision device by a request of a terminal device;
comparing the stored traveling history information stored on the information provision device with the planned route and selecting a route that is a same as the acquired planned route, or a route having a difference from the acquired planned route within a set distance, from traveling routes along which the vehicle traveled to be decided as the provision route, by the information provision device;
referring to the stored traveling history information and determining at least one of power consumed during traveling along the determined provided route and a charging location along route that the vehicle passes by during traveling along the determined provided route by the information provision device;
transmitting the decided provision route and the charging location along route to the terminal device by the information provision device;
receiving the decided provision route and the charging location along route transmitted by the information provision device, displaying and providing information on a result of the determination to a driver of the vehicle by the terminal device so that the driver confirms the provision route and the charging location when driving the vehicle to a destination beforehand;
determining power consumed during traveling along the provided route for each driver based on the stored traveling history information by the information provision device;
transmitting information on maximum power consumption and minimum power consumption among the determined power consumption values for the drivers to the terminal device by the information provision device; and
displaying the maximum power consumption and the minimum power consumption based on the information transmitted by the information provision device by the terminal device so that a user understands variation of the power consumption among the drivers
wherein the stored traveling history information stored on by the information provision device to synthesize a plurality of traveling routes along which a plurality of vehicles traveled is referred and a synthesized route is formed as the provided route by the information provision device, and
extracting, from the stored traveling history information stored on the information provision device, at least one of power consumed during traveling along each traveling route making up the synthesized route and a charging location along route that the vehicles pass by during traveling along each traveling route making up the synthesized route by the information provision device.

* * * * *